United States Patent [19]

Sakakibara et al.

[11] Patent Number: 5,024,638
[45] Date of Patent: Jun. 18, 1991

[54] ACTUATOR FOR A FRICTIONAL ENGAGING DEVICE

[75] Inventors: Shiro Sakakibara, Toyokawa; Masahiro Hasebe; Masashi Hattori, both of Anjo, all of Japan

[73] Assignee: Aisin AW Co., Ltd., Anjo, Japan

[21] Appl. No.: 288,152

[22] Filed: Dec. 22, 1988

[30] Foreign Application Priority Data

Dec. 26, 1987 [JP] Japan .................. 62-330482
Nov. 18, 1988 [JP] Japan .................. 63-291634

[51] Int. Cl.$^5$ .................. F16D 67/02; F16H 57/00
[52] U.S. Cl. .................. 475/210; 192/12 D; 192/18 B; 192/48.2; 192/94; 475/319
[58] Field of Search .............. 192/0.02 R, 12 D, 18 B, 192/48.1, 48.2, 48.9, 94; 475/210, 319

[56] References Cited

U.S. PATENT DOCUMENTS

| 684,432 | 10/1901 | Isler .................. 192/0.02 R |
| 3,235,045 | 2/1966 | Pop .................. 192/94 X |
| 4,895,236 | 1/1990 | Sakakibara et al. .............. 192/94 X |

FOREIGN PATENT DOCUMENTS

| 0731086 | 6/1955 | United Kingdom . |
| 0741776 | 12/1955 | United Kingdom . |
| 0761285 | 11/1956 | United Kingdom . |
| 0764878 | 1/1957 | United Kingdom . |
| 1127966 | 9/1968 | United Kingdom . |
| 2115515 | 9/1983 | United Kingdom . |
| 2185301 | 7/1987 | United Kingdom . |

Primary Examiner—Richard Lorence
Attorney, Agent, or Firm—Spencer & Frank

[57] ABSTRACT

An actuator for frictional engaging devices is controlled by electric signals from a control device and is disposed in a power transmission device. The actuator includes a torque generating mechanism and has at least two movably mounted frictional engaging devices having respective initial positions. The actuator includes a torque-thrust conversion mechanism which converts torque generated from the torque generating mechanism into an augmented thrust force for moving the frictional engaging devices from the respective initial positions to different positions respectively. The torque-thrust conversion mechanism has a given initial position and connecting means which transmit the augmented thrust force generated from the torque-thrust conversion mechanism to each respective one of the frictional engaging devices, whereby the torque-thrust conversion mechanism can move the frictional engaging devices from the respective initial positions to different positions respectively by rotation in one rotational direction from the given initial position.

21 Claims, 16 Drawing Sheets

| POSITION \ ELEMENT | | C1 | C2 | 50 | B1 | B2 | F |
|---|---|---|---|---|---|---|---|
| P | | | | | | | |
| R | | | | | ○ | ○ | |
| N | | | | | | | |
| D | L | ○ | | ○* | | | ○ |
| | H | ○ | ○ | ○* | | | |
| S | L | ○ | | ○* | ○ | | ○ |
| | H | ○ | ○ | ○* | | | |

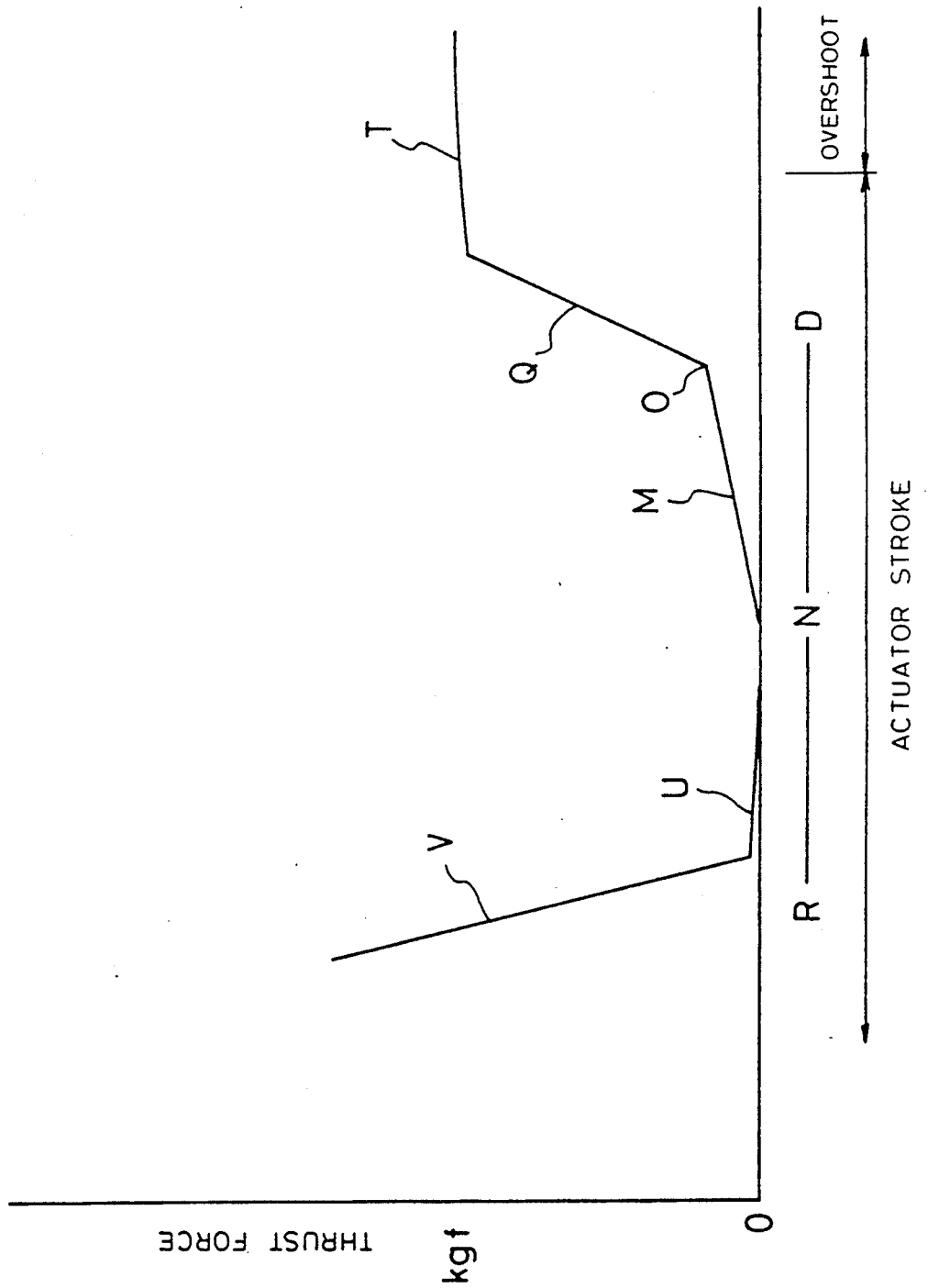

F I G. 15
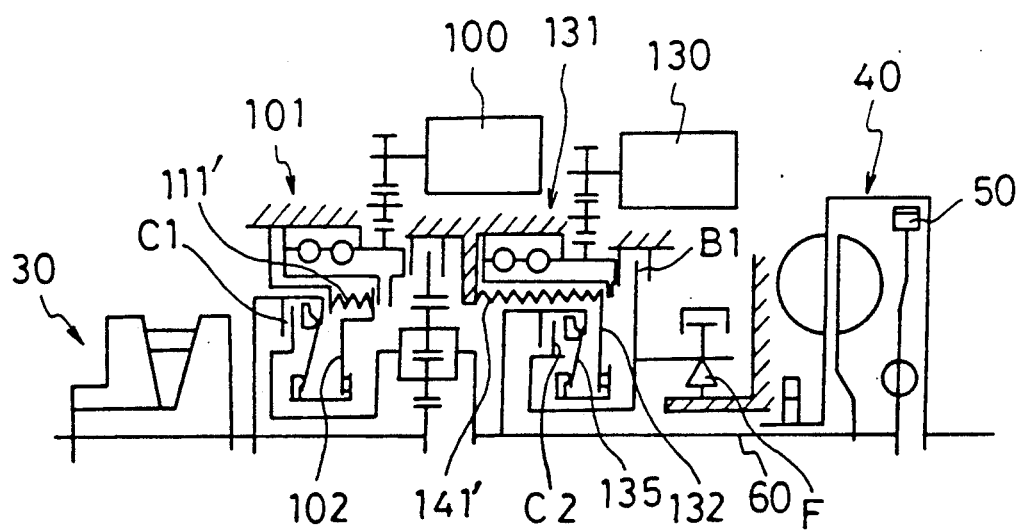

ACTUATOR FOR A FRICTIONAL ENGAGING DEVICE

BACKGROUND OF THE INVENTION

1. Field of the Invention

The present invention relates to an actuator to operate a frictional engaging device such as a frictional clutch, frictional brake, etc., and in particular relates to an actuator which performs one function by selectively causing one of two opposing motions developed from each of two frictional engaging devices, such as actuators for a forward/reverse switching device or a high/low mode switching device. In detail, the present invention relates to an actuator for a frictional engaging device which mechanically converts rotational power transmitted from a power source such as a motor into a thrust force.

2. Description of the Related Art

In general, a power transmission device for an automobile, etc., such as a continuously variable transmission (The Japanese patent application No. 63-158353; unpublished at the application of the present invention) which is constitued by the combination of a continuously variable transmission device (CVT) using a metal belt and a high/low mode switching device and a forward/reverse switching device, has devices which have certain functions which operate as a result of one or the other of two opposing motions of two frictional engaging devices. For example, these devices include a forward/reverse switching device which engages certain element of a planetary gear mechanism and at the same time releases another element so that the forward/reverse switching device performs a certain function, and a high/low mode switching device which connects a certain element of the planetary gear mechanism with an input shaft, etc. to perform another function and restrains another element to perform another function. Each element of the planetary gear mechanism is controlled by frictional engaging devices such as multiple disc clutches and multiple (or band) brakes, etc.

For example, a planetary gear mechanism for the high/low mode switching device has a low coast & reverse brake which operates the planetary gear mechanism as a reduction mechanism (namely in a low speed mode) and a high clutch which works as a split drive mechanism (namely in a high speed mode), while a planetary gear mechanism for the forward/reverse switching device has a forward clutch which takes up normal rotation and a reverse brake which takes up reverse rotation.

Conventionally, these frinctional engaging devices employ a hydraulic actuator (having a hydraulic-thrust conversion mechanism) composed of a piston and a cylinder to press or release an operation plate and a receiving plate.

In the case where the above hydraulic actuator mechanism is employed, an oil pump is driven by a power source such as an engine to produce hydraulic pressure. The hydraulic pressure developed by the oil pump is adjusted by a hydraulic control mechanism such as a regulator valve, the adjusted hydraulic pressure is switched by a hydraulic switching mechanism such as a control valve, and the hydraulic pressure from the hydraulic switching mechanism is supplied to a hydraulic-thrust conversion mechanism composed of a hydraulic actuator. The hydraulic pressure is converted into a thrust force by the hydraulic-thrust conversion mechanism, the thrust force is applied to a frictional engaging device such as a multiple disc clutch, etc. through a pressing mechanism for frictional engaging such as a pressure plate, and the frictional engaging device is engaged. At this time, in general, running conditions such as throttle pressure and vehicle speed, etc. are detected by sensors, and the detected information is sent to a control unit (CPU). Further, electrical signals are sent from the control unit (CPU) to each solenoid valve controlling the hydraulic control mechanism and the hydraulic switching mechanism, and the solenoid valves are controlled the electrical signals.

Consequently, in the case where hydraulic pressure is used, electrical signals which are control signals are inevitably converted into hydraulic pressure. Due to this, it is difficult to conduct precise control and make a simple structure because of oil leakage and response delay. As a result, reliability is lowered.

In addition to the above, an oil pump is required having a power source for producing hydraulic pessure. In general, though an output from an engine is used as a power source for the oil pump, the engine does not work only for the oil pump, so the engine output has a wide range of rotational speeds, and accordingly the power source of the oil pump has to bear a great amount of loss, and additional efforts are required to design the manner of power takeout to power the pump. On the other hand, where an electric motor is used as an exclusive power source for the oil pump. However, in this case, because electric energy which is easy to control has to be converted into hydraulic pressure, efficiency has to be sacrificed.

Particularly, in the case where one function attained by one frictional engaging device is released and at the same time another frictional engaging device is engaged, both frictional engaging devices are controlled by respective hydraulic actuators. Then controlling and synchronizing two frictional engaging devices whose motions are required to be in opposing relation requires a complicated hydraulic control mechanism, and an additional further complicated hydraulic control mechanism is required for safety purposes to prevent a locking of the transmission device caused by simultaneous engaging of two frictional engaging devices.

SUMMARY OF THE INVENTION

An object of the invention is to provide an actuator for frictional engaging, which is a comparatively small actuator enabling precise and quick response, and satisfying various other present requirements.

Referring to the drawings, FIG. 1 or FIG. 12 for example features are provided as follows: torque generating mechanisms (100, 130) such as AC or DC motors (including for example a servo motor, a stepping motor, a geared motor, and an ultrasonic motor) for converting electric energy into torque, torque-thrust conversion mechanisms (101, 131) such as a thread mechanism (including a ball thread mechanism) for converting torque into a thrust force and adding an additional force, and connecting means (102 and 103, or, 132 and 133) for transmitting the thrust force converted from a torque-thrust conversion mechanism (101 or 131) and being movable in different directions to respective fricional engaging devices (C1 and B2, or, C2 and B1). From a certain position of the torque-thrust conversion mechanism (101 or 131) where one frictional engaging device (C1 or C2) is engaged and another engaging device (B1 or B2) is relesed by a movement in one direction of the torque-thrust conversion mechanism (101 or 131), one of the above-mentioned frictional engaging devices (C1 or C2) is released and the other frictional engaging device (B1 or B2) is engaged.

FIG. 1 shows, for example, the following arrangement: in the case where the torque generating mechanism (100, 130) is at a home position, the one of the frictional engaging devices (C1, C2) is engaged and another frictional engaging device (B1, B2) is released. By rotation in one direction from the home position of the torque generating mechanism (100, 130), the above-mentioned one frictional engaging device (C1, C2) is released and the above-mentioned another frictional engaging device (B1, B2) is engaged. As shown in FIG. 12 for example, the following arrangement is also shown: in the case that the toque generating mechanism (100, 130) is at the home position, the above-mentioned frictional engaging devices (C1, C2, B1, B2) are all released, and by one rotational movement from the home position of the torque generating mechanism (100, 130), the above-mentioned one frictional engaging device (C1, C2) is engaged, and by another rotational movement in another direction from the home position of the torque generating mechanism (100, 130), the above-mentioned another frictional engaging device (B2, B1) is engaged.

For example, in the case where the above structure is employed in a forward-reverse switching device (90), the forward-reverse switching device (90) is composed of a dual planetary gear mechanism which transmits rotation together with an input shaft (60) to an output member (30b) by connecting a sun gear (90S) integrated in the input shaft (60), two pinions (90P1), (90P2) (one of the pinions, 90P1, is not shown in FIG. 1), a ring gear (90R) and a carrier (90C) connected to the output member (30b). By restraining the ring gear (90R), reverse rotation is transmitted to the output member (30b). A forward clutch (C1) is situated between the sun gear (90S) and the carrier (90C), and a reverse brake (B2) to restrain the ring gear (90R) is installed. As one example (referring to FIG. 1), under normal conditions when the torque generating mechanism (100) is not energized, the reverse brake (B2) is kept in a released condition and the forward clutch (C1) is kept in a released condition by a coned disc or disc spring (105) constituting a spring means. For another example (referring to FIG. 12), a return spring means (111') is provided having a strong pressing force opposing a spring means (105) for operation, under the normal conditions so that the forward clutch (C1) is kept in the released condition.

The torque-thrust conversion mechanism (100) is composed of a ball thread mechanism having a fixed female thread section (106) and a male thread section (109) which is connected to the female thread section (106) through a ball (107). The male thread section (109) is connected to the torque generating mechanism (100) such as an electric motor through gears, etc. The male thread section (109) interlocks the connecting means (102) by a movement of the male thread section (109) in one direction, while the male thread section (109) interlocks another connecting means (103) by a movement of the male thread section (109) in another direction. Furthermore, the connecting means (102) contacts the center of the coned disc spring (105) through bearings (113 or 120), and the middle part of the coned disc spring (105) is supported by a supporting member (112).

For example, the high/low mode switching device as shown in FIG. 2, for example, is composed of a planetary gear mechanism having a ring gear (20R) having a rotation which is always input through a belt driven continuously variable transmission device (30), a carrier (20C) which supports a pinion ans connects an output member (70), and a sun gear (20R) which connects a selective input member (81). The selective input member (81) is supported on a rigid member (15a) through a one-way clutch (F), and the one-way clutch (F) is connected to a direct coupling input shaft (61) (referring to FIG. 1) or an input shaft (60) (referring to FIG. 12) through a high clutch (C2), and the selective input member (81) can be restrained by a low coast & reverse brake (B1).

A torque-thrust conversion mechanism (131), as same as that of the forward/reverse switching device, is composed of a ball thread mechanism having a rigid side female thread section (106) and a male thread section (139) which is connected to the female thread section (106), wherein the male thread section (139) is connected to the torque generating mechanism (130). The male thread section (139) interlocks one connecting means (132) by a movement of the male thread section (139) in one direction, while the male thread section (139) interlocks another connecting means (133) by a movement of the male thread section (139) in another direction, the connecting means (132) contacts the center of the coned disc spring (135) through bearings (143), (150), and the middle part of the coned disc spring (135) is supported by a supporting member (142).

Based on the above structures, when the torque generating mechanism (100, 130) is at a certain position, one frictional engaging device (C1, C2) is in an engaged condition and another frictional engaging device (B1, B2) is in a released condition, and the power transmission device (90, 20) is in the certain condition. In this condition, by electric signals sent from the control unit (C), electrical energy is provided to the torque generating mechanism (100, 130), and the torque generating mechanism (100, 130) generates a certain torque. Based on the torque, the torque-thrust conversion mechanism (101, 131) generates a thrust force in one direction, and when the above-mentioned one frictional engaging device (C1, C2) is released while the above-mentioned another frictional engaging device (B2, B1) is engaged, the power transmission device (90, 20) is changed the power transmission device (90, 20) is changed to a condition which is different from the above-mentioned certain condition.

As one example, more concrete example used as the forward/reverse switching device (90) is explained. Referring to FIG. 1, for example, when the torque generating mechanism (100) is at the home position, the forward clutch (C1) is engaged and the reverse brake (B2) is released by the pressing force of the spring means (coned disc spring) (105). Under these conditions, the sun gear (90S) and the carrier (90C) of the dual planetary gear mechanism (90) are connected together, so that rotation of the input shaft (60) is transmitted to the output member (30b).

For an automatic transmission mounted on a vehicle, the forward running condition occupies a large amount of vehicle usage compared with the reverse running condition. Under this forward running condition, the torque generating mechanism (100) is at the home position, electrical energy is not provided to the torque generating mechanism (100), and a reaction force which is transmitted from the coned disc spring (105) to the thrust bearing (113) is small. Consequently, though the bearing (113) is in rotation along with the rotation of the coned disc spring (105) and the forward clutch (C1), the load (PV number) is kept low.

Under the above conditions, when electrical energy is provided to the torque generating mechanism (100), the male thread section (109) of the ball thread mechanism (101) rotates. The male thread section (109) relatively rotates against the female thread section (106) and moves in an axial direction. This movement of the male thread section (109) moves the connecting means (102) in the same direction through the coil spring (111) and the male thread section (109) also rotates the coned disc spring (105) clockwise via the thrust bearing (113), with the supporting member (112) providing a fixed center of rotation. Due to this motion, the forward clutch (C1) is released, and the connecting means (103) is moved in the same direction via the bearing (110), then the reverse brake (B2) is engaged. At this time, the male thread section (109) moves by a certain distance even after the forward clutch (C1) is released to engage the reverse brake (B2) completely, however this additional movement of the male thread section (109) is absorbed by the coil spring (111). Accordingly, an extreme deformation of the coned disc spring (105) is prevented, and an advantageous timing for engagement of the clutch and brake is securely established. Under these conditions, the ring gear (90R) is restrained, then the rotation from the input shaft (60) is transmitted the carrier (90C) through the sun gear (90S) and the pinion, and the rotation of the output member (30b) is a reverse rotation. At this time, though the pressing force of the coned disc spring (105) is applied to the torque generating mechanism (100) as torque thorugh the ball thread mechanism (101), the torque generating mechanism (100) is kept at a certain position by provision of a certain electrical current continuously to the torque generating mechanism (100) or by installation of a holding means such as an electromagnetic brake (which is self holding, in the case of an ultrasonic motor). On the other hand, a large thrust force of the coned disc spring (105) is applied to the thrust bearing (113), however the disc spring (105) is under decelerated rotation and the amount of rotation is small, and furthermore the reverse running condition does not occupy a large portion of time in usage. Accordingly, there are no problems with regard to the durability of the bearing (110).

Next is shown in FIG. 12 for example: in the case where the torque generating mechanism (100) is at the home position, due on a return spring means (111') which opposes the operating spring means (the coned disc spring (105)), the forward clutch (C1) is released and the reverse brake (B2) is also released.

Consequently, when the engine starts, even in event of failure of electric circuits subsequently the actuator (11a) is in a no loaded condition, and the forward clutch (C1) and the reverse brake (B2) are under a released condition, so that the vehicle does not run when the engine starts. Due to this, a fail-safe system is established.

From the released condition of the forward clutch (C1) and the reverse brake (B2), when the torque generating mechanism (100) rotates in one direction the male thread section (109) presses the return spring means (111') and the operating spring means (105) engages the clutch (C1). Due to this motion, the forward/reverse switching device (90) is in the forward running condition. Under this condition, the torque generating mechanism (100) is held at the forward running condition by operation (ON) of the electromagnetic brake. On the other hand, when the torque generating mechanism (100) rotates in another direction from the home position, the male thread section (109) engages the reverse brake (B2), and the forward/reverse switching device (90) is in a reverse running condition. This reverse running condition is held by the electromagnetic brake, etc.

A concrete example used for the high/low mode switching device (20) is explained as follows, based on FIG. 1. In the case where the torque generating mechanism (130) is at the home position, the high clutch (C2) is under the engaged condition by the coned disc spring (135), and the low coast & reverse brake (B1) is released. Under this condition, with regard to the planetary gear mechanism (20) (referring to FIG. 2), a certain rotation is transmitted to the ring gear (20R) through the belt driven continuously variable transmission device (30), and rotation which is transmitted to the selective input member (81) from the direct coupling input shaft (61) through the high clutch (C2) is transmitted to the sun gear (20S) through a transfer device (80). Because of this, the combined torque by the sun gear (20S) and the ring gear (20R) is transmitted to the output member (70).

Under a normal running condition, the high speed mode is used for overwhelmingly longer periods of time than the low speed mode. Under the high speed mode, a reaction force which is developed from the coned disc spring (135) which is applied to the thrust bearing (143) is samll, and accordingly the load (PV number) is kept low.

When the torque generating mechanism (130) rotates by application of electrical energy, the ball thread mechanism (132) moves one connecting means (132), the high clutch (C2) is released and the reverse brake (B1) is engaged. At this moment, as in the previous description, the coil spring (141) prevents extreme deformation of the coned disc spring (135). Under this condition, the selective input member (81) is restrained, and as a result the sun gear (20S) is restrained through the transfer device (80), and the rotation of the ring gear (20R) transmitted from the belt driven continuously variable transmission device (30) is decelerated and taken from the carrier (20C) and transmitted to the output member (70).

On the other hand, as shown in FIG. 12, in the case where the torque generating mechanism (130) is at the home position due to a return spring means (141') which opposes the operating spring means (135), the high clutch (C2) is released and the low coast & reverse brake (B1) is also released, and only the one-way clutch (F) is under operation.

Under these conditions, the sun gear (20S) is restrained by the one-way clutch (F), the high/low mode switching device (20) is in the low speed mode which works only works as a reduction mechanism. When the torque generating mechanism (130) rotates in another direction from the home position, the male thread section (139) presses the return spring means (141') and the operating spring means (135) engages the high clutch (C2), so that the high speed mode is obtained. When the torque generating mechanism (130) rotates in this direction from the home position, the male thread section (139) engages the low coast & reverse brake (B1). When the high clutch (C2) is engaged or the low coast & reverse brake (B1) is engaged, the electromagnetic brake is electrified, and the torque generating mechanism (130) is kept position in accordance with the condition that the high clutch (C2) or the low coast & reverse brake (B1) is engaged.

The numbers and letters which are shown in parentheses refer to FIG. 1, FIG. 2 and FIG. 12 are referred to in the detailed description of the preferred embodiment hereunder.

Of course, the application of the actuator for frictional engaging of the present invention is not limited to the forward/reverse switching device shown and the high/low mode switching device, and it is possible for the above-mentioned actuator to be employed in other power transmission devices such as transmission devices which change transmission paths by engaging or releasing each element of a planetary gear mechanism, etc.

BRIEF DESCRIPTION OF THE DRAWINGS

These and other objects as well as advantages of the present invention will become clear by the following description of a preferred embodiment of the present invention with reference to the accompanying drawings, wherein:

FIG. 13 is a graphical representation indicating the relation between actuator stroke and thrust force with reference to the embodiment shown in FIG. 12;

FIGS. 14-16 are schematic illustrations of additional embodiments which are based on the embodiment of FIG. 12.

DETAILED DESCRIPTION OF THE PREFERRED EMBODIMENT

The present invention is explained as follows.

Figures 2, 3:
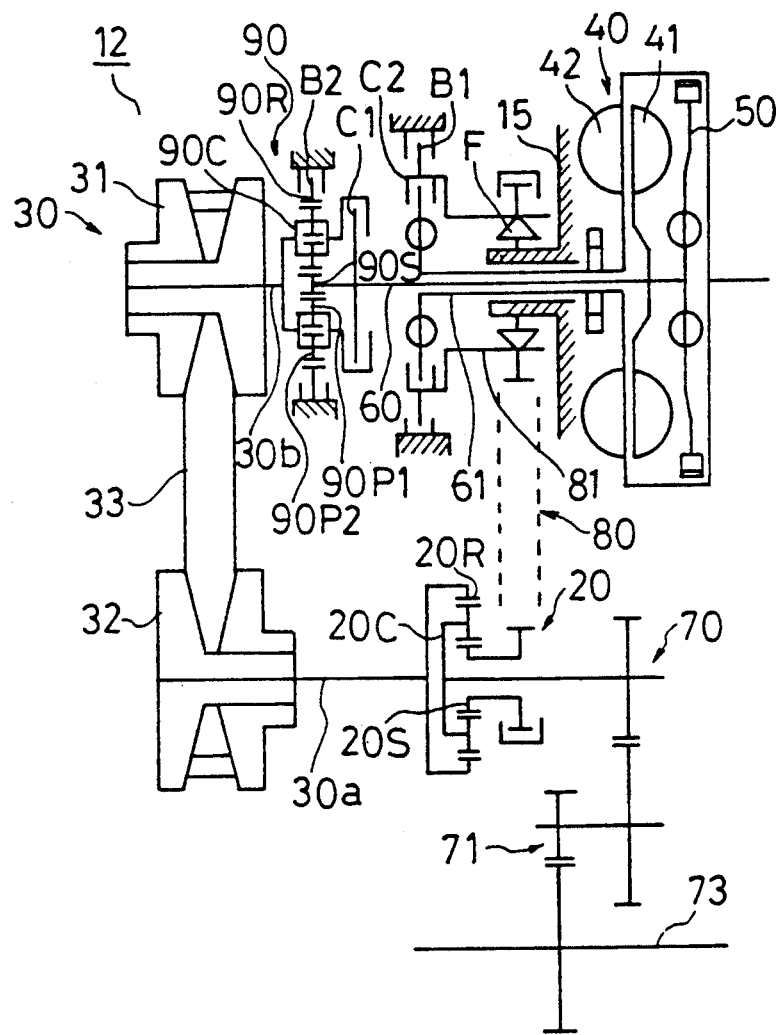
FIG. 2 is a schematic illustration of the continuously variable transmission.
FIG. 3 is a table of operation showing the operation of each element at each shift position.

Referring first to FIG. 2, a continuously variable automatic transmission 12 has a single planetary gear mechanism 20, a belt-driven continuously variable transmission device 30, a transfer device 80, an output member 70 constituted by a reduction gear device 71, etc., a forward/reverse switching device 90 constituted by a dual planetary gear mechanism, and further includes a hydraulic coupling 40, a lock-up clutch 50 having a centrifugal clutch, an input shaft 60 connected to a turbine runner 41 of the hydraulic coupling 40 and the lock-up clutch 50, and a direct coupling input shaft 61 constituted by a sleeve member enclosing the input shaft 60 and directly connected to a pump impeller 42.

On the single planetary gear mechanism 20, a ring gear 20R interlocks a secondary shaft 30a of the belt driven continuously variable transmission device 30, and a carrier 20C interlocks the output member 70, a sun gear 20S, and via the transfer device 80, connects to a low one-way clutch F and a low coast & reverse brake B1 both of which constitute a restraining means, and the sun gear 20S also connects to the direct coupling input shaft 61.

On the dual planetary gear device 90, a sun gear 90S connects to the input shaft 60, a carrier 90C connects to a primary shaft 30b of the belt driven continuously variable transmission device 30 and connects to the input shaft 60 through a forward clutch C1, and a ring gear 90R connects to a reverse brake B2.

Based on the above structure, the clutches, the brakes and the one way clutches of the continuously variable automatic transmission 12 operate at each position as shown in FIG. 3. In the table of operation the * mark means that the lock up clutch 50 operates at a required moment.

Desecribed in detail, at low speed mode L in D range, the low one-way clutch F operates other than when the forward clutch C1 is engaged. Under this condition rotation of the engine crank shaft is transmitted to the input shaft 60 through the lock up clutch 50 or the hydraulic coupling 40, furthermore the rotation of the engine crank shaft is transmitted to the sun gear 90S directly, and transmitted to the carrier 90C through the forward clutch C1. Accordingly the dual planetary gear mechanism 90 rotates together with the input shaft 60, this normal rotation is transmitted to the primary shaft 30b of the belt driven continuously variable transmission 30, further rotation shifted to required speed by the device 30 is transmitted from the secondary shaft 30a to the ring gear 20R of the single planetary gear device 20. While under this condition, the sun gear 20S which is a reaction force supporting member receiving reaction force is restrained by the low one-way clutch F through the transfer device 80, and the rotation of the ring gear 20R is taken from the carrier 20C as decelerated rotation. Further the decelerated rotation is transmitted to an axle 73 through the reduction gear mechanism 71, etc.

At high speed mode H in D range, in addition to the forward clutch C1, the high-clutch C2 is engaged. Under this condition, as stated in the above paragraph, the normal rotation shifted to required speed by the belt driven continuously variable transmission device 30 is taken from the secondary shaft 30a and transmitted to the ring gear 20R of the single planetary gear device 20. While rotation of the direct coupling input shaft 61 directly connected to the engine crank shaft is transmitted to the sun gear 20S through the high-clutch C2 and the transfer device 80, accordingly the torque developed from the ring gear 20R and the sun gear 20S is combined, and the combined torque is taken from the carrier 20C. At this time, as rotation against the reaction force is transmitted to the sun gear 20S through the transfer device 80, a torque loop is not developed, consequently normal torque is transmitted through the transfer device 80, and the combined torque taken from the carrier 20C is transmitted to the axle 73 through the reduction gear mechanism 71, etc.

With regard to the operation at D range, torque is not transmitted when reverse torque is applied (or the engine brake is applied) because of the one-way clutch F, while at the S range, torque is transmitted when reverse torque is applied because of the operation of the low coast & reverse brake B1 in addition to the low one-way clutch F.

At the R range, the low coast & reverse brake B1 and the reverse brake B2 operate. Under this condition, rotation of the input shaft 60 is transmitted from the carrier 90C to the belt driven continuously variable transmission device 30 as a reverse rotation because the ring gear 90R is restrained. On the other hand, the sun gear 20S is restrained by the operation of low coast & reverse brake B1, and the reverse rotation from the belt driven continuously variable transmission device 30 is decelerated by the planetary gear device 20, and taken from the output member 70.

Still further, an embodiment of the present invention is explained with reference to FIG. 4.

The continuously variable automatic transmission 12 has a transmission case 15 separable in three portions. In this case 15, the input shaft 60, the direct coupling input shaft 61 and the primary shaft 30b are situated coaxially (in series) with free rotation, then the first axle is formed, and the secondary shaft 30a and a gear shaft 70a are situated coaxially (in series) with free rotation, then the second shaft is formed. Furthermore on the first axle the lock-up clutch 50 composed of a centrifugal clutch, the fluid coupling 40, the forward clutch C1, the high clutch C2, the low coast & reverse brake B1, the reverse brake B2, an operating section 10 composed of the low one-way clutch F, the dual planetary gear mechanism 90 constituting a forward/reverse switching device, and an oil pump 17. And on the second axle, the single planetary gear mechanism 20 is situated.

Figure 1:
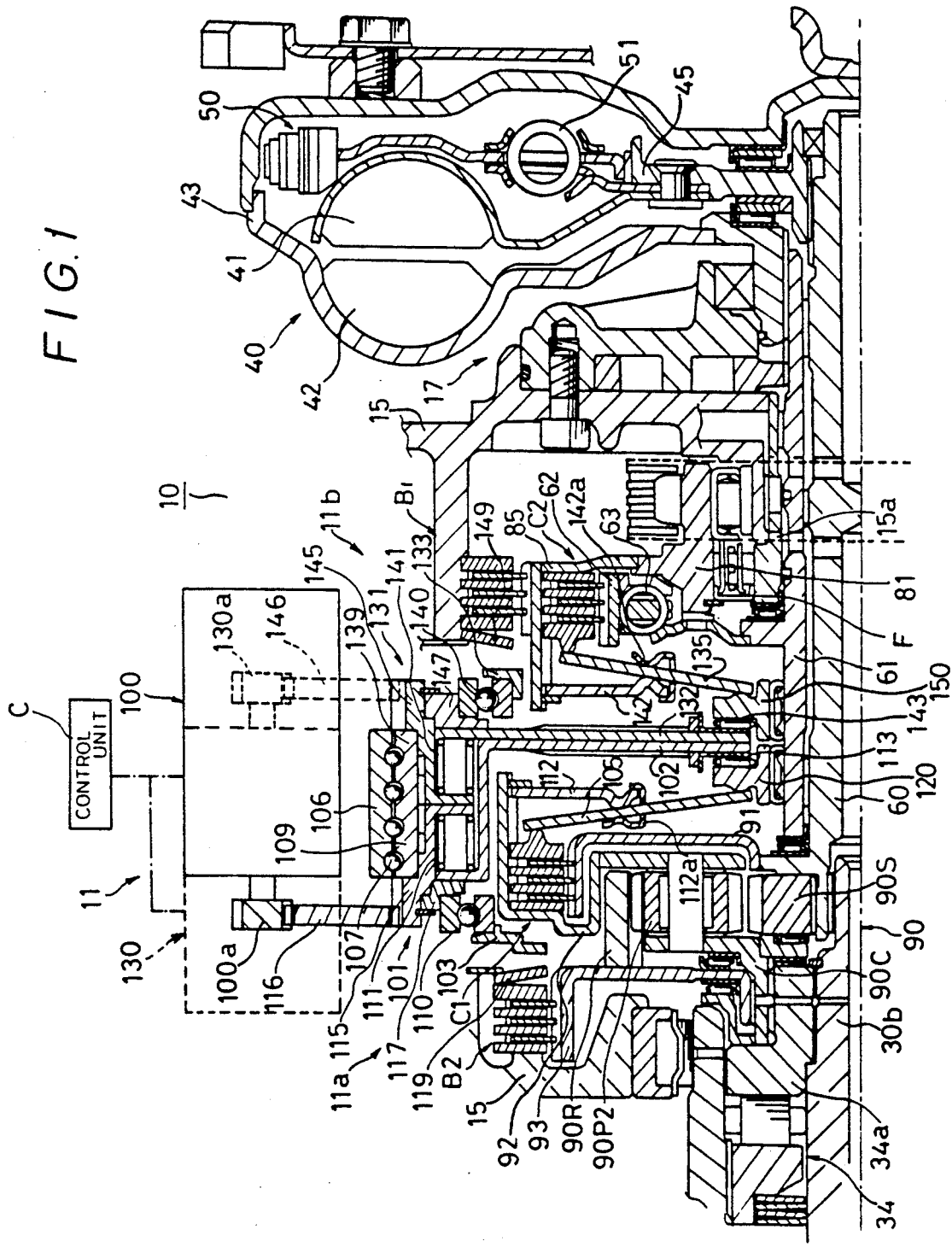
FIG. 1 is a cross sectional view of an embodiment of the actuator of the present invention which is used for a forward/reverse switching device and a high/low mode switching device of a continuously variable transmission.

Further, the first axle section is explained along with FIG. 1. The fluid coupling 40 has a coupling case 43 connected to the engine crank shaft. On the case 43, the pump impeller 42 is constituted, a spline is constituted at the base of the coupling case 43, and the coupling case 43 is spline-coupled to the direct coupling input shaft 61 composed of a sleeve member. The turbine runner 41 of the hydrualic coupling 40 is fixed to a boss 45, and the boss 45 is spline coupled to the input shaft 60 which is enclosed by the direct coupling input shaft 61 through a needle bearing. And in the coupling case 43, the lock-up clutch 50 composed of the centrifugal clutch is installed, and the clutch 50 is fixed to the turbine boss 45 through a damper 51. On the area of the case 15 adjacent to the hydraulic coupling 40, an oil pump 17 is installed, and a rotor of the pump 17 is connected to the direct coupling input shaft 61.

The direct coupling input shaft 61 is supported on an inner side of a projection 15a constituted on the case 15 through a needle bearing, and an input sprocket 81 of the transfer device 80 is supported on an outer side of the projection 15a through a bearing. Further, a boss section on the sprocket 81 is connected to the projection 15a of the case 15 through the low one-way clutch F, and a flange 85 is erected radialy from the boss. A brim of the flange 85 constitutes splines on both inner and outer surfaces, and the low coast & reverse brake B1 constituted by multiple discs is situated between the outer spline of the brim of the flange 85 and a spline made on the case 15. The high-clutch C2 constituted by multiple discs is situated between the inner spline of the brim of the flange 85 and a connecting boss 62, and the connecting boss 62 is connected to the direct coupling input shaft 61 through a damper 63.

On the other hand, the sun gear 90S of the dual planetary gear mechanism 90 is spline-coupled at an end section of the input shaft 60 and a flange 91 is erected radially from the end section of the input shaft 60. And the end section of the input shaft 60 encloses the primary shaft 30b of the belt driven continuously variable transmission device 30, and the end section of the input shaft 60 and the primary shaft 30b are arranged in series. An adjusting cam mechanism 34 is fixed on the primary shaft 30b, and an input side cam 34a of the mechanims 34 is spline-coupled to the carrier 90C. Furthermore, the carrier 90C supports a first pinion 90P1 and a second pinion 90P2 (ref. FIG. 2), a connecting member 92 is installed radially, and the forward clutch C1 made up by multiple discs is situated between an inner spline made on a brim of the connecting member 92 and the outer spline of the flange 91. A supporting member 93 fixing the ring gear 90R is supported, with free rotation, on the carrier boss, and the reverse brake B2 is situated between a spline made on an outer brim of the supporting member 93 and the spline made on the case 15.

An actuator unit 11 related to the present invention is situated at an area between the low coast & reverse brake B1 and the high-clutchy C2, and the reverse brake B2 and the forward clutch C1. The actuator unit 11 is constituted by a forward/reverse switching actuator 11a and a high/low mode switching actuator 11b both of which are situated adjacently. The actuator 11 has a motor 100 for the forward/reverse switching actuator and a motor 130 for the high/low mode switching actuator, which are separated from each other at a certain circumferential distance. These motors are rotating magnetic field motors such as a commutator motor and a step motor, etc., and electric motors such as a servo motor and an ultrasonic motor. These motors have a holding means such as an electromagnetic brake to hold a certain rotative position of the motors. (The holding means is the same as a holding means 167 for a motor 166 for speed shifting. The holding means 167 is explained later, and is not shown in the drawings.) At an inner side of the motors 100 and 130, a female thread section 106 is fixed on the case 15. And an inner side of the female thread section 106, a male section 109 for forward/reverse switching and a male section 139 for high/low mode switching are arranged in series (side by side). The male sections 109 and 139 are connected with the female section 106 through balls 107. Furthermore, on these male thread sections 109 and 139, pressing members 115 and 145 are fixed rigidly against rotation and sliding movement. These pressing members 115 and 145 have gears on the outer side of the female section 106, and the gear of the pressing member 115 meshes with an output gear 100a of the motor 100 through a gear 116, while the gear of the presing member 145 meshes with an output gear 130a of the motor 130 through a gear 146. The pressing members 115 and 145 have lugs whose backs contact each other. Connecting members 102, 132 whose axial movements are restrained by snap rings are inserted with axial movements allowed, and coil springs 111, 141 are installed between the lugs and the connecting members 102, 132. Restraining members 17, 147 are fixed on the pressing members 115, 145, and the restraining members 117, 147 are connected to other connecting members 103, 133 through ball bearings 110, 140. The connecting member 103 is arranged to contact a coned disc spring 119 of the brake B2, while the connecting member 133 is arranged to contact a coned disc spring 149 of the brake B1. Back sides of the former connecting members 102, 132 contact each other, and the members 102 and 132 are expanded toward the inner side. Block members 120, 150 are supported on the direct coupling input shaft 61 through needle bearings with both rotation and sliding movements allowed, and these block members 120, 150 and the connecting members 102, 132 contact each other through thrust bearings 113, 143. A supporting member 112 is fixed on a tip of the brim of the connecting member 92 by a snap ring, a receiver 112a is fixed on the end tip of the member 112, and the receiver 112a supports a middle point of a coned disc spring 105. An outer skirt of the coned disc spring 105 presses the forward clutch C1 tangentially, and a center portion of the spring 105 contacts the block member 120. Due to the above arrangement of the coned disc spring 105, the coned disc spring 105 at its tangential position, is arranged to provide the receiver 112a with the greatest reaction force so that less thrust force is applied to the thrust bearing 113 through the block member 120. Similarly, a supporting member 142 is fixed on a tip of the brim of the flange 85 by a snap ring, and a receiver 142a is fixed on the end tip of the member 142, and the receiver 142a supports a middle point of a coned disc spring 135. An outer skirt of the coned disc spring 135 tangentially presses the high-clutch C2 so that the high-clutch C2, and a center portion of the spring 135 contacts the block member 150.

Figure 4:
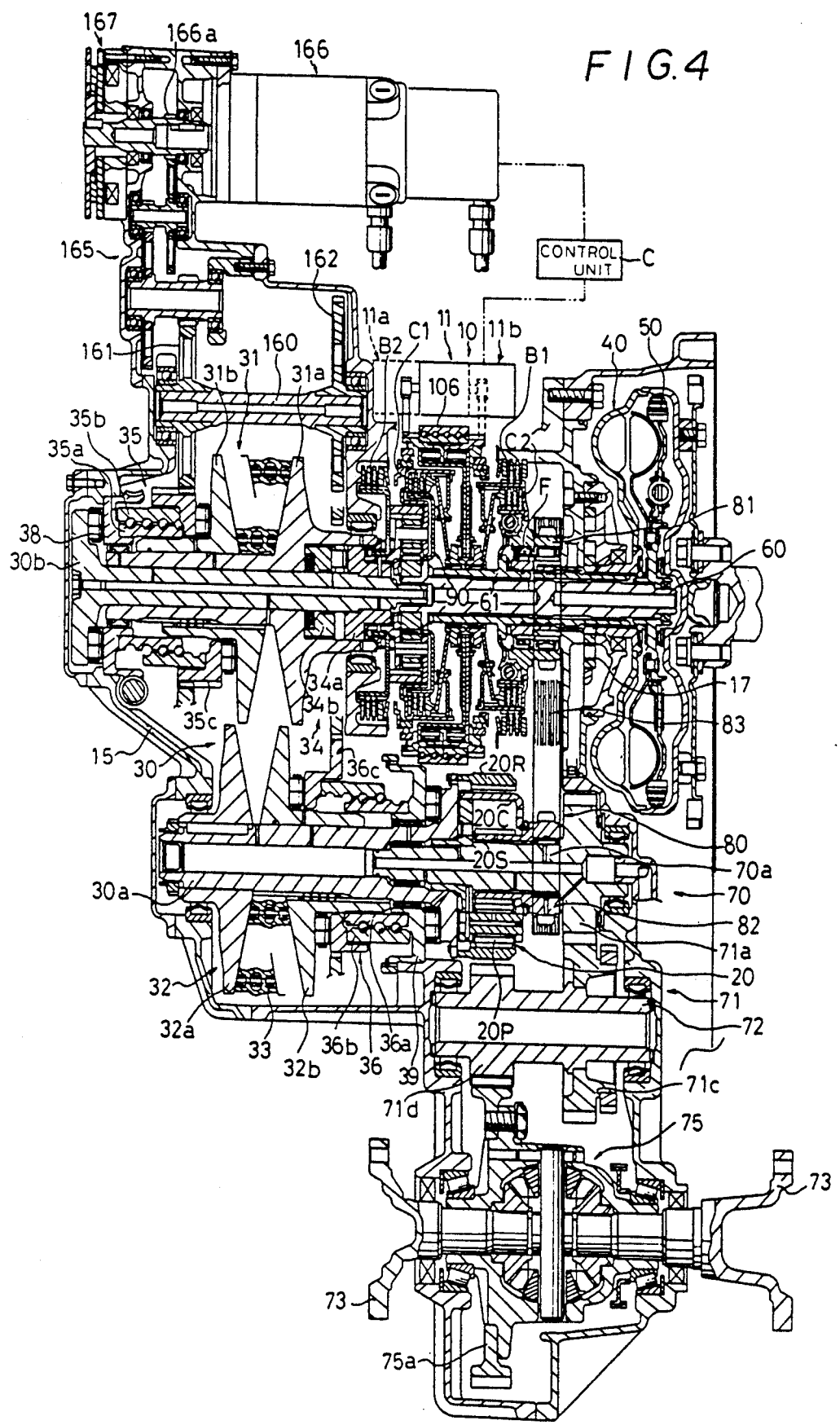
FIG. 4 is a cross sectional view of the continuously variable transmission.

The belt driven continuously variable transmission device 30, as shown in FIG. 4, has a primary pulley 31, a secondary pulley 32 and a belt 33 lapped around the pulleys 31 and 32. And, both the primary and secondary pulleys have stationary sheaves 31a, 32a and movable sheaves 31b, 32b. Furthermore, a cam mechanism 34 is installed on the primary pulley 31. The cam mechanism 34 has a rigid side cam 34a fixed on the primary shaft 30b and a movable side cam 34b contacting the stationary sheave 31a with a pressing force through a coned disc spring so that the cam mechanism 34 provides axial force in proportion to the transmitted torque. The movable sheave 31b is supported on a boss of the stationary sheave 31a through a ball spline with only slide movement allowed, and a ball thread mechanism 35 is installed on the back side of the movable sheave 31b. With reference to the ball thread mechanism 35, a bolt section 35a is fixed on an adjusting member 38 which is adjustable at any rotative position toward the case 15 and is connected to the input shaft 30b through a thrust bearing with no sliding movement allowed. A nut section 35b is connected to the movable sheave 31b through a thrust bearing so that the nut section 35b moves axially with the movable sheave 31b. With reference to the secondary pulley 32, a stationary sheave 32a is fixed on the output shaft 30a so that the stationary sheave 32a and the output shaft 30a are supported on the case 15 with rotaion allowed, while the movable sheave 32b is supported on the output shaft 30a through a ball spline with only sliding movement allowed. Furhermore, a ball thread mechanism 36 is installed at the back side of the movable sheave 32b, a bolt section 36a is fixed on an adjusting member 39 which is adjustable at any rotative position toward the case 15 and is connected to the output shaft 30a through a thrust bearing with no sliding movement allowed. A nut section 36b is connected to the movable sheave 32b through a thrust bearing so that the nut section 36b moves axially with the movable sheave 32b.

Between the primary pulley 31 and the secondary pulley 32, an operation shaft 160 is supported with rotation allowed. As FIG. 4 is a development drawing, the operating shaft 160 is depicted on the upper side, however an actual arrangement is that the operating shaft 160 is situated intermediately between the primary shaft 30b and the secondary shaft 30a in the front elevation. A circular gear 161 and a non-circular gear 162 are fixed on the operation shaft 160, the circular gear 161 meshes with a circular gear 35c which is fixed on the nut section 35b of the primary pulley 31, while the non-circular gear 162 meshes with a spiral shaped non-circular gear 36c fixed on the nut section 36b of the secondary pulley 32. The circular gear 161 is connected to an output gear 166a of a shifting motor 166 through two rows of gears 165 each of which is constituted by a spur gear or a helical gear. The shifting motor 166 is an electirc motor, and an electromagnetic brake 167 is installed on the output shaft 166a. The electromagnetic brake 167 operates when the motor 166 is under a non-electrified condition so that the primary pulley 31 and the secondary pulley 32 are kept a certain shiftting position despite the gear rows 165 and the ball thread mechanism 35, 36 which are capable of reversible transmission.

The single planetary gear mechanism 20 is installed on the gear shaft 70a constituting the second shaft, the ring gear 20R is connected to a flange of the output shaft 30a of the belt driven continuously variable transmission 30. The sprocket 82 which is constituted on the same member on which the sun gear 20S is made is supported on the gear shaft 70a, and furthermore the carrier 20C which supports the ponion 20P with rotation allowed is fixed on the gear shaft 70a.

On the other hand, a silent chain 83 is lapped around the sprocket 82 and the sprocket 81 which is supported by the low one-way clutch F. These sprockets 81, 82 and the silent chain 83 constitute the transfer device 80.

The gear shaft 70a and a gear 71a are constituted together, the gear shaft 70a and the gear 71a constitute the output member 70, and the gear 71a meshes with a gear 71c which is fixed on an intermediate shaft 72. Further, a small gear 71d is constituted on the intermediate shaft 72, the gear 71d meshes with a ring gear 75a which is fixed on the differential gear device 75, then the reduction gear device 71 is constituted. And, right and left front axle shafts 73 extend from the differential gear device 75.

An operation on the embodiment is explained.

Rotation of the engine crank shaft is transmitted to the direct coupling input shaft 61 through the coupling case 43, and the rotation of the engine crank shaft is transmitted to the input shaft 60 through the lock-up clutch 50 or the fluid coupling 40. The rotation of the direct coupling input shaft 61 operates the pump 17, and the rotation of the direct coupling input shaft 61 is transmitted to the connecting boss section 62 through the damper 63. The rotation of the input shaft 60 is transmitted to the sun gear 90S of the dual planetary gear device 90 and the flange 91.

In the D range and the S range, the motor 100 for the forward/reverse switching device is at a home position, the forward clutch C1 is engaged due to the pressing force of the coned disc spring 105, and the reverse brake B2 is released. Under this condition, the sun gear 90S and the carrier 90C rotate together, accordingly the ring gear 90C rotates together, and this normal rotation is transmitted to the input shaft 30b of the belt driven continuously variable transmission device 30. For any transmission mounted on a vehicle, forward running is overwhelmingly longer than that of reverse running. Under this forward running condition, the electric motor 100, being at the home position, is in a non-electrified condition, and a reaction force is exerted by the coned disc spring 105 against the pressing force of the forward clutch C1, and most of such reaction force is absorbed by the receiver 112a and the supporting member 112, so that the reaction force applied to the thrust bearing 113 is small. Accordingly, though the coned disc spring 105 rotates with the forward clutch C1 and the bearing 113 is also rotating, the load (PV number) is kept low, so durability of the motor 100 and the thrust bearing 113 are secured without causing any problems.

The rotation of the primary shaft 30b is transmitted to the cam mechanism 34, and transmitted to the stationary sheave 31a of the primary pulley 31 and to the movable sheave 31b through the ball spline. At this time, the cam mechanism 34 transmits the axial force which is proportional to the input torque transmitted to the input or primary shaft 30b to the back side of the stationary sheave 31a through the coned disc spring installed in the cam mechanism 34, while the movable sheave 31b is kept at a certain position by the ball thread mechanism 35 which determines its postion based on a certain shift ratio. Consequently, a reaction force equal to the axial force is transmitted to the back side of the movable sheave 31b through the thrust bearing, and due to this, the primary pulley 31 holds the belt 33 by a force which is proportional to the input torque. Furthermore, rotation of the belt 33 is transmitted to the secondary pulley 32, and is then transmitted to the output shaft 30a. Under the belt transmission being conducted, when the shifting motor 166 is operated based on the signals from each sensor detecting throttle opening, and vehicle speed, etc., the operation shaft 160 rotates through the gear rows 165. Because of the rotation of the shaft 160, the nut section 35b of the ball thread mechanism 35 rotates through the circular gears 161 and 35c, and the nut section 36b of the secondary pulley 32 rotates through the non-circular gears 162 and 36c. Due to these motions, relative rotation is developed between the nut sections 35b, 36b, and the bolt sections 35a, 36b which are fixed on the case 15 with no rotation allowed. Consequently, the ball thread mechanism 35, 36 moves the movable sheaves 31b, 32b through the thrust bearings so that the primary pulley 31 and the secondary pulley 32 set a certain effective diameter, and then the predetermined torque ratio is obtained. At this time, though the actual traveling distance of the movable sheaves which is determined by the belt 33 and the traveling distance of the ball thread mechanisms do not differ because the ball thread mechanisms move linearly, the movable sheaves 31b, 32b travel an originally determined distance because the secondary pulley 32 side rotates through the non-circular gears 37c, 36c. With reference to the belt holding force developed by the stationary sheaves 31a, 32a and the movable sheaves 31b, 32b, the belt holding force at the side of the primary pulley 31 acts such that the force pulls the input shaft 30b through the thrust bearing, and at the same time, the belt holding force at the side of the secondary pulley 32 acts such that the force pulls the output shaft 30a, and accordingly no force is transmitted to the case 15.

Furthermore, the rotation of the output shaft 30a of the belt driven continuously variable transmission device 30 is transmitted to the ring gear 20R of the planetary gear mechanism 20, and is transmitted to the gear shaft 70a through the carrier 20C.

At the low speed mode L of the D range, the actuator 11b for the high/low mode switching device is under the condition that the actuator 11b rotates by a certain amount, and stops at a certain position based on the signals sent from the control unit C. The connecting member 132 slightly moves the coned disc spring 135 through the thrust bearing 143 and the block member 150 against the pressing force developed from the coned disc spring 135. Under this condition, the high-clutch C2 is released and the low coast & reverse brake B1 are released. Consequently, as shown in FIG. 3, the low one-way clutch F is under motion during the torque transmission from the ring gear 20R to the carrier 20C and the sun gear 20S receives the reaction force, however, the sun gear 20S is stopped by the low one-way clutch F through the transfer device 80. Namely the single planetary gear mechanism 20 works as a reduction mechanism. Due to this, the rotation of the output shaft 30a of the belt driven continuously variable transmission device 30 is only decelerated by the single planeraty gear mechanism 20, and the rotation is decelerated through the reduction gear device 71 composed of the gears 71a, 71c, the intermediate shaft 72, the gear 71d and the gear mounting case 75a. Further the rotation is transmitted to the right and left front axle shaft 73 through the differential device 75.

When the throttle opening ratio and the vehicle speed comes to a certain value, the electric motor 130 for the high/low mode switching device rotates so that the motor 130 comes to the home position based on the signals from the control unit C. Under this condition, the high-clutch C2 is under an engaged condition by the coned disc spring 135 and the low-coast reverse brake B2 is released. As a result, a certain amount of rotation is transmitted to the ring gear 20R through the belt driven continuously variable transmission 30, and the rotation of the direct coupling input shaft 61 is transmitted to the input sprocket 81 through the damper 63, the connecting member 62 and the high clutch C2, further, the rotation of shaft 61 is transmitted to the sun gear 20S through the transfer device 80. At this time, as the input side sprocket 81 of the transfer device 80 receives the reaction force from the sun gear 20S through the low one-way clutch F, the sprocket 81 starts rotation smoothly without having shift shock, and torque is transmitted to the sun gear 20S. Due to this, the toque shifted by the belt driven continuously variable transmission 30 and the torque transmitted through the transfer device 80 are combined at the single planetary gear mechanism 20, and the combined torque is transmitted from the carrier 20C to the gear shaft 70a. Further, as in the low speed mode, the combined torque is transmitted to the right and left front axles 73 through the reduction gear device 71 and the differential device 75.

Under a normal running condition, the high speed mode condition is far longer than that of the low speed mode. Then, under the high speed mode, the motor 130 is at its home position, so that the motor 130 is under a non-electrified condition, and the reaction force which is developed from the coned disc spring 135 transmitted to the thrust bearing 143 is small; accordingly the load (PV number) is kept low.

Under the low speed mode L of the S range, the motor 130 rotates based on the signals sent from the control unit C. Due to this, the pressing member 145 rotates together with the male thread section 139 through the gear 146 and the male thread section 139 and the pressing member 145 relatively rotate against the stationary female thread section 106, so that the member 145 moves by a certain distance in the right direction in the drawing. Due to this, one connecting member 132 moves toward the right direction through the coil spring 141, through the thrust bearing 143 and the block member 150, rotates the coned disc spring 135 with the receiver 142a being a center of the rotation, the pressing force of the coned disc spring 135 against the high clutch C2 is released, and then the high clutch C2 is released. Along with the movement of the pressing member 145, another connecting member 133 also moves toward the right direction through the bearing 140, and the connecting member 133 engages the low coast & reverse brake B1 through the coned disc spring 149. Under this condition, the sprocket 81 is stopped in both normal and reverse rotation by the low coast & reverse brake B1. Rotation can be developed by negative torque such as is caused by engine braking. And, the high speed mode of the S range is the same as that of the D range.

On the other hand, at the R range, the electric motor 100 is electrified based on the signals sent from the control unit C, the pressing member 115 is rotated through the gear 116, and the male thread section 109 of the ball thread mechanism 101 is rotated. Then the male thread section 109 relatively rotates against the stationary female thread section 106 and moves in the axial direction. The male section 109 moves one connecting member 102 in the same direction. Furthermore, the movement of the male thread section 109 rotates the coned disc spring 105 in a clockwise direction with the receiver 112 being a center of rotation through the thrust bearing 113 and the block member 120, then the forward clutch C1 is released. Due to the movement of the pressing member 115 in the left direction, this movement also moves another connecting member 103 in the left direction; then the reverse brake B2 is engaged. At this time, though the male thread section 109 moves by a certain distance after the forward clutch C1 is released so that the reverse brake B2 is completely engaged, this movement of the male thread section 109 is absorbed by the coil spring 111, so that an extreme deformation of the coned disc spring 105 is prevented, and timing for engaging of the clutch and the brake is securely assured. At the same time, the motor 130 for the high/low mode switching device rotates, as already stated, the high clutch C2 is released and the low coast & reverse brake B1 is engaged. As in the above, an extreme deformation of the coned disc spring 135 is prevented by the coil spring 141. Though the pressing force of the coned disc springs 105, 135 are transmitted to the motors 100, 130 as torque through the ball thread mechanism 101, 131, the motors are kept at a certain rotative position by keeping the motors under an electrifed condition or providing the motors with a holding means such as an electromagnetic brake (or a self hold, in the case of an ultrasonic motor). Under this condition, with regard to the dual planetary gear mechanism 90, the ring gear 90R is stopped by the reverse brake B2, the rotation of the input shaft 60 is input from the sun gear 90S and taken from the carrier 90C as decelerated reverse rotation through the pinion 90P1, 90P2, and the rotation taken from the carrier 90C is transmitted to the input shaft 30b of the belt driven continuously variable transmission unit 30. Though the reaction torque developed from the sun gear 20S of the single planetary gear mechanism 20 is transmitted to the sprocket 81 through the transfer device 80, the sprocket 81 is stopped by the low coast & reverse brake B1 in motion.

In addition to the above, various modified examples of the present invention are shown along with FIG. 5, FIG. 6, FIG. 7, FIG. 8, FIG. 9 and FIG. 10. In these drawings, with reference to the same portions, parts, or members shown in FIG. 1 to FIG. 4, the same numbers are used, and further explanation of these portions, parts or members is eliminated.

Figure 5:
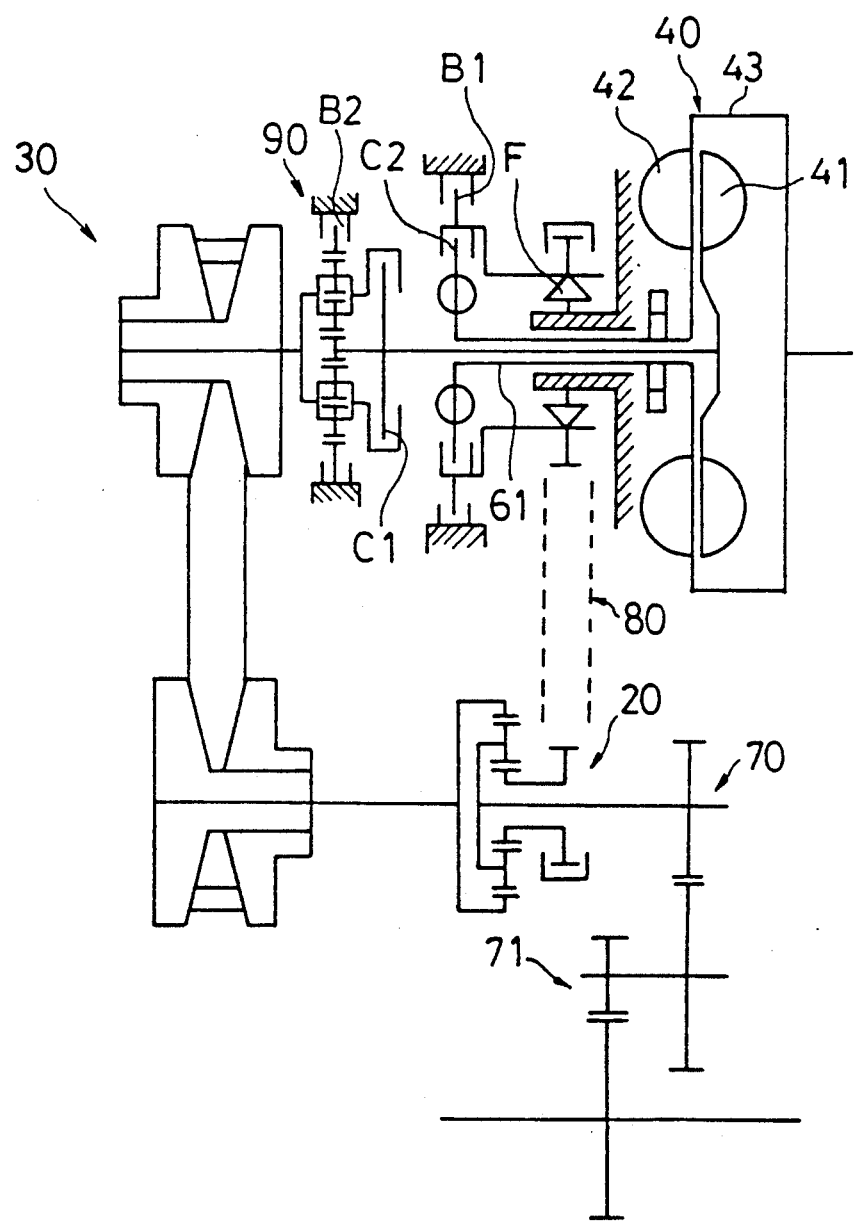
FIG. 5 is a schematic illustration of a partially modified continuously variable transmission.
Figure 6:
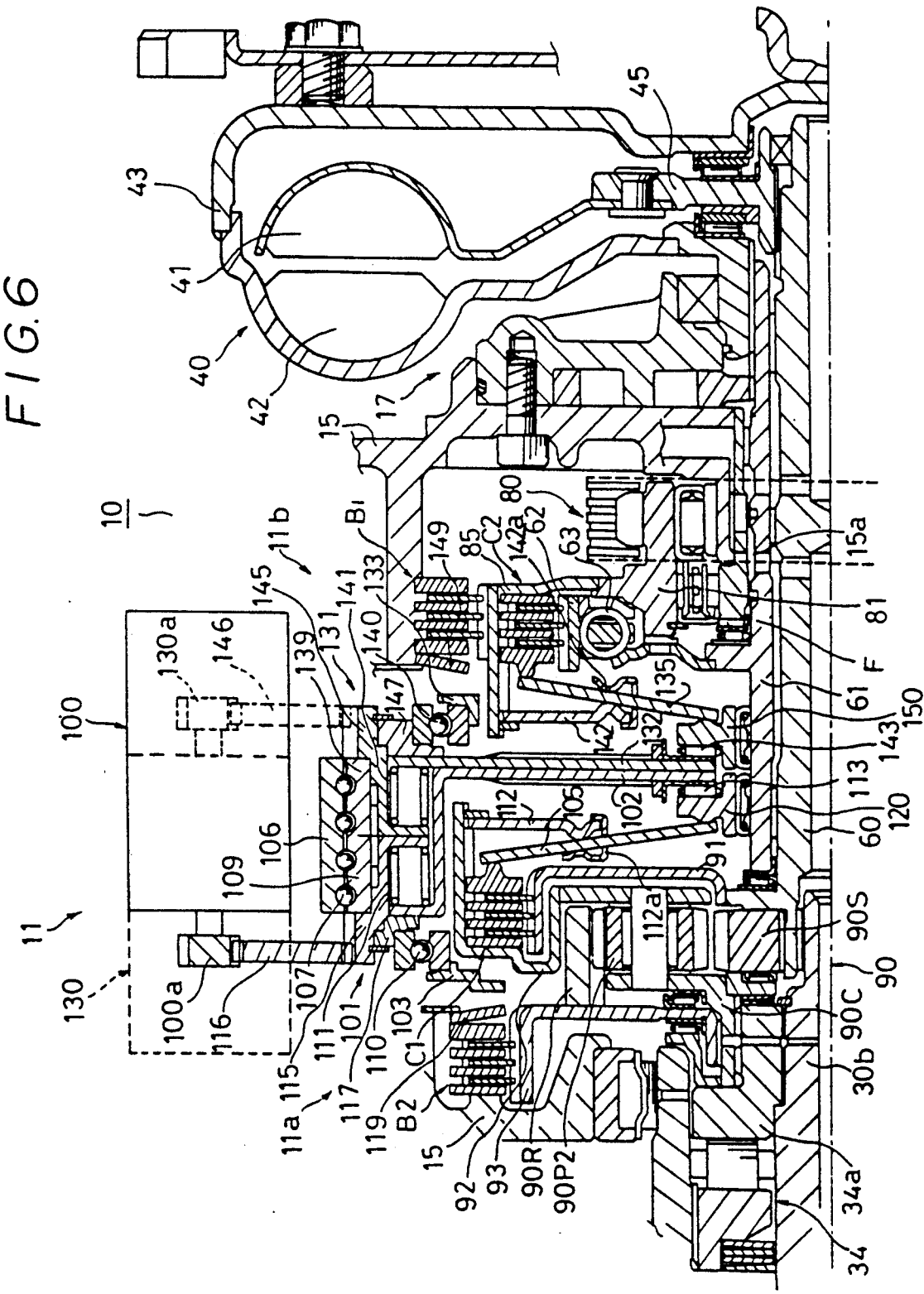
FIG. 6 is a cross sectional view of a main part of FIG. 5.

In FIG. 5 and FIG. 6, the lock-up clutch 50 is eliminated. Accordingly the rotation of the engine crank shaft is transmitted to the high clutch C2 by the direct coupling input shaft 61 as stated in the previous embodiment, while the rotation of the engine crank shaft is transmitted to the belt driven continuously variable transmission 30 through the hydraulic coupling 40 all the time.

Figure 7:
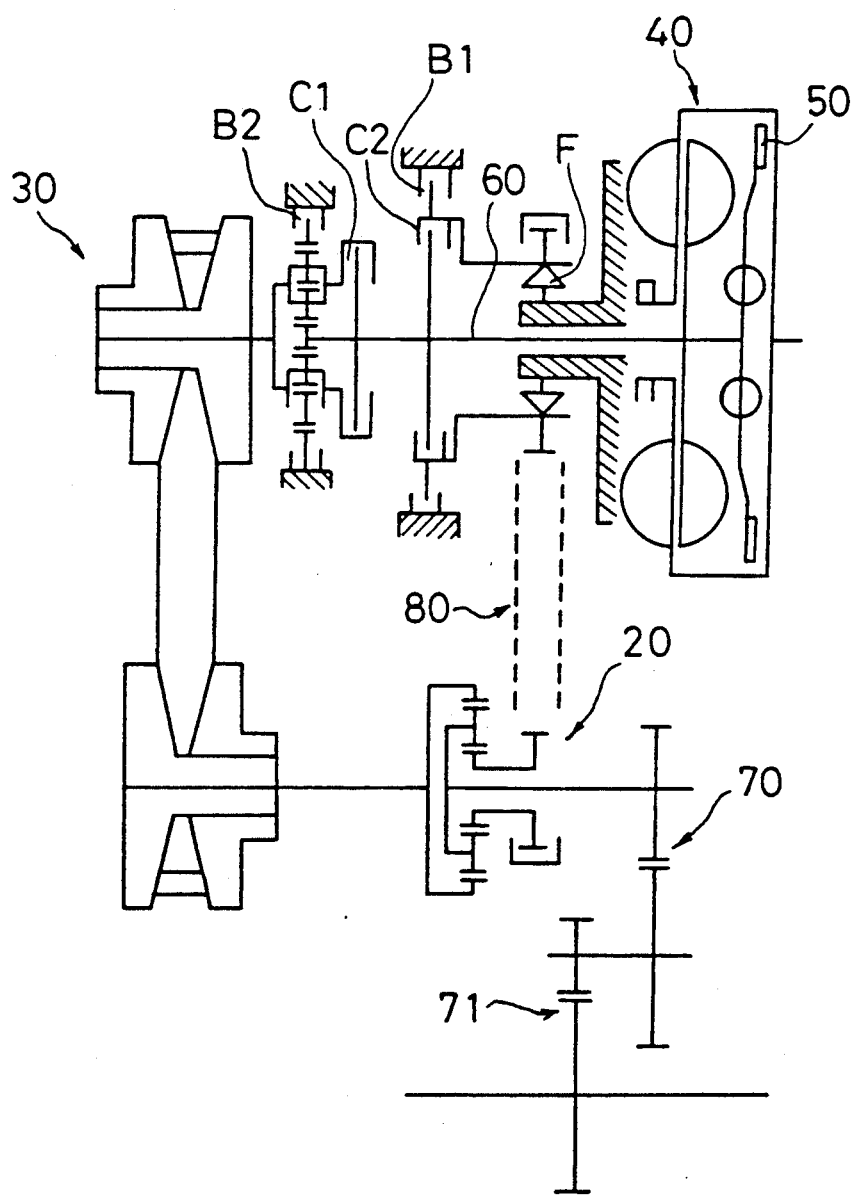
FIGS. 7-10 are schematic illustrations of different embodiments.

In FIG. 7, the direct coupling input shaft 61 is eliminated. Namely the input side of the high clutch C2 is connected to the input shaft 60. The rotation of the engine crank shaft is transmitted to both the belt driven continuously variable transmission device 30 and the high clutch C2 through the hydrualic coupling 40 or the lock-up clutch 50.

Figure 8:
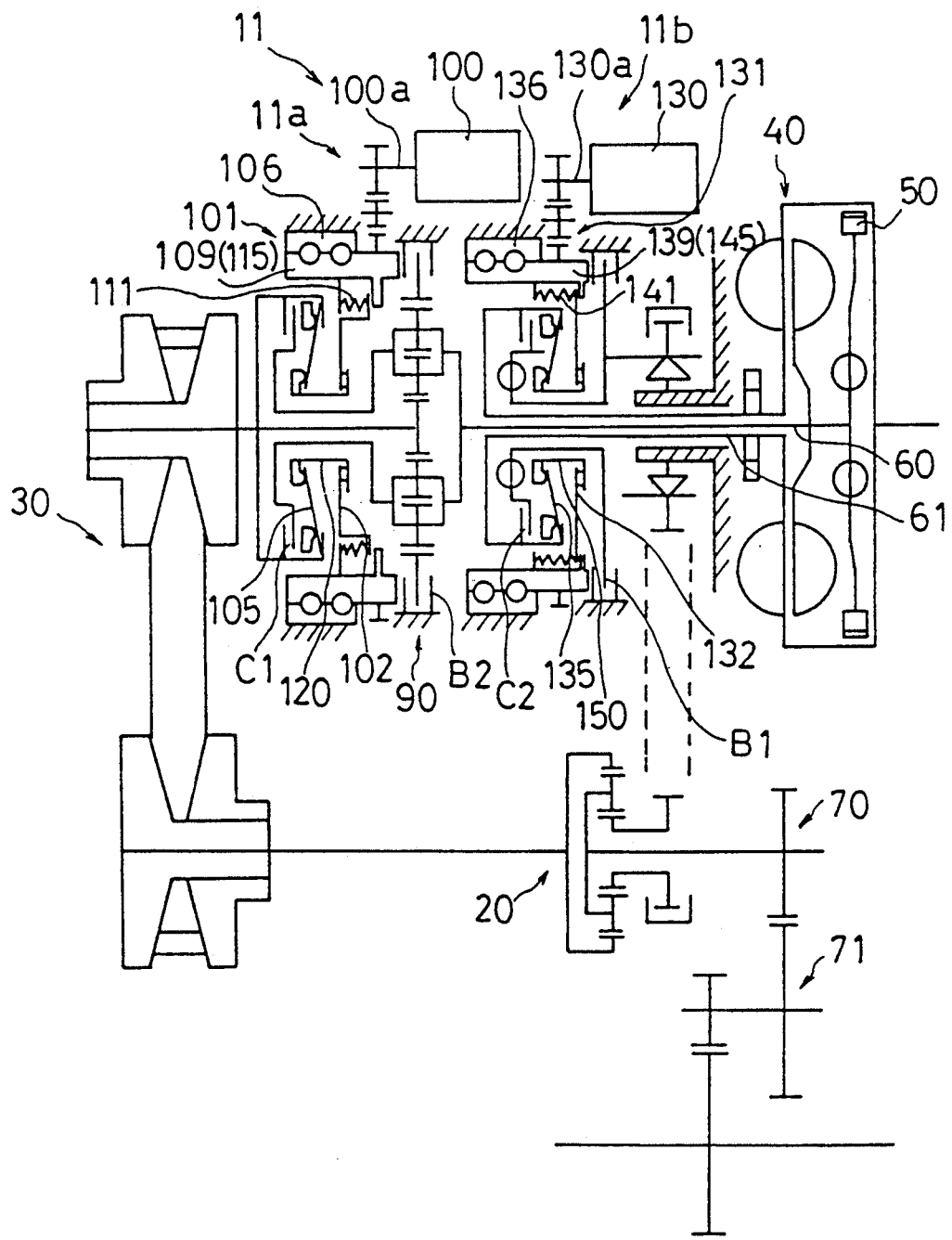

In FIG. 8, a partially modified actuator is explained. The differences compared with the previous embodiment are itemized as follows: (1) the coned disc springs 105, 135 to keep the forward clutch C1 and the high clutch C2 engaged are tension type springs; (2) the arrangement of the clutches and brakes differ.

Namely,. the actuator 11a for the forward/reverse switching device and the actuator 11b for the high/low mode switching device are situated closely to the clutches C1, C2, and the brakes B1, B2 respectively. Concretely, the motors 100, 130 are arranged axially, and the output shafts 100a, 130a extend in the same direction. The stationary side female thread sections 106, 136 of each of the ball thread mechanisms 101, 131 are separately situated axially. Furthermore, the male thread sections (which are embodied with the pressing members 115, 114) 109, 139 are connected to the connecting members 102, 132 through the tension type coil springs 111, 141. The block members 120, 150 connect the connecting members 102, 135 (through the thrust bearing) and the coned disc springs 105, 135 with opposing the direction of tension. And the forward clutch C1 is situated at the opposite side of the connecting member 102 against the dual planetary gear mechanism 90, while the connecting member 132 for the actuator 11b of the high/low mode switching device is situated between the high clutch C2 and the low coast & reverse brake B1.

Figure 9:
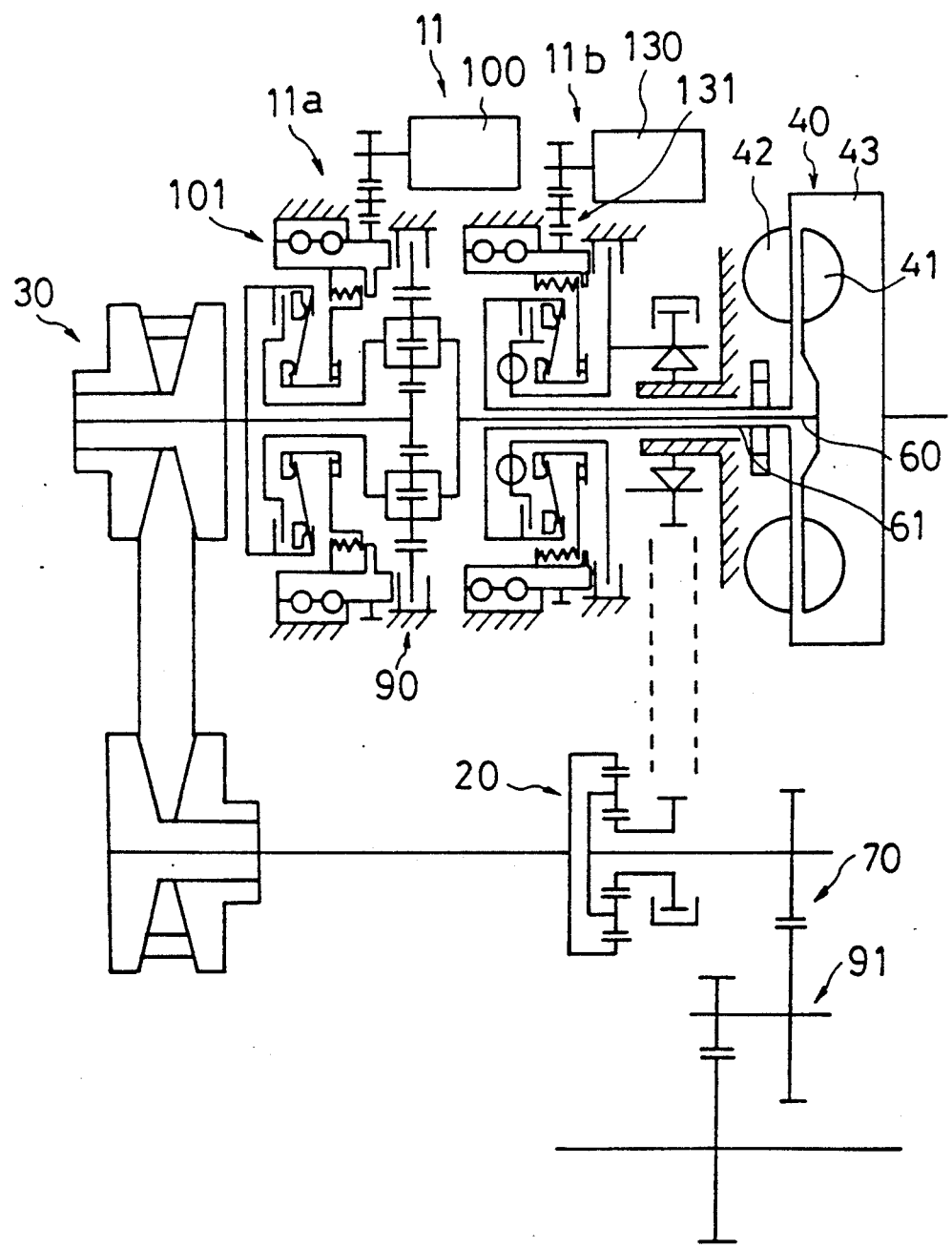

In FIG. 9, the lock-up clutch 50 is eliminated from the embodiment of FIG. 8. Consequently as shown in the embodiments of FIG. 5 and FIG. 6, the rotation of the engine crank shaft is transmitted to the belt driven continuously variable transmission 30 through the hydraulic coupling 40 all the time.

Figure 10:
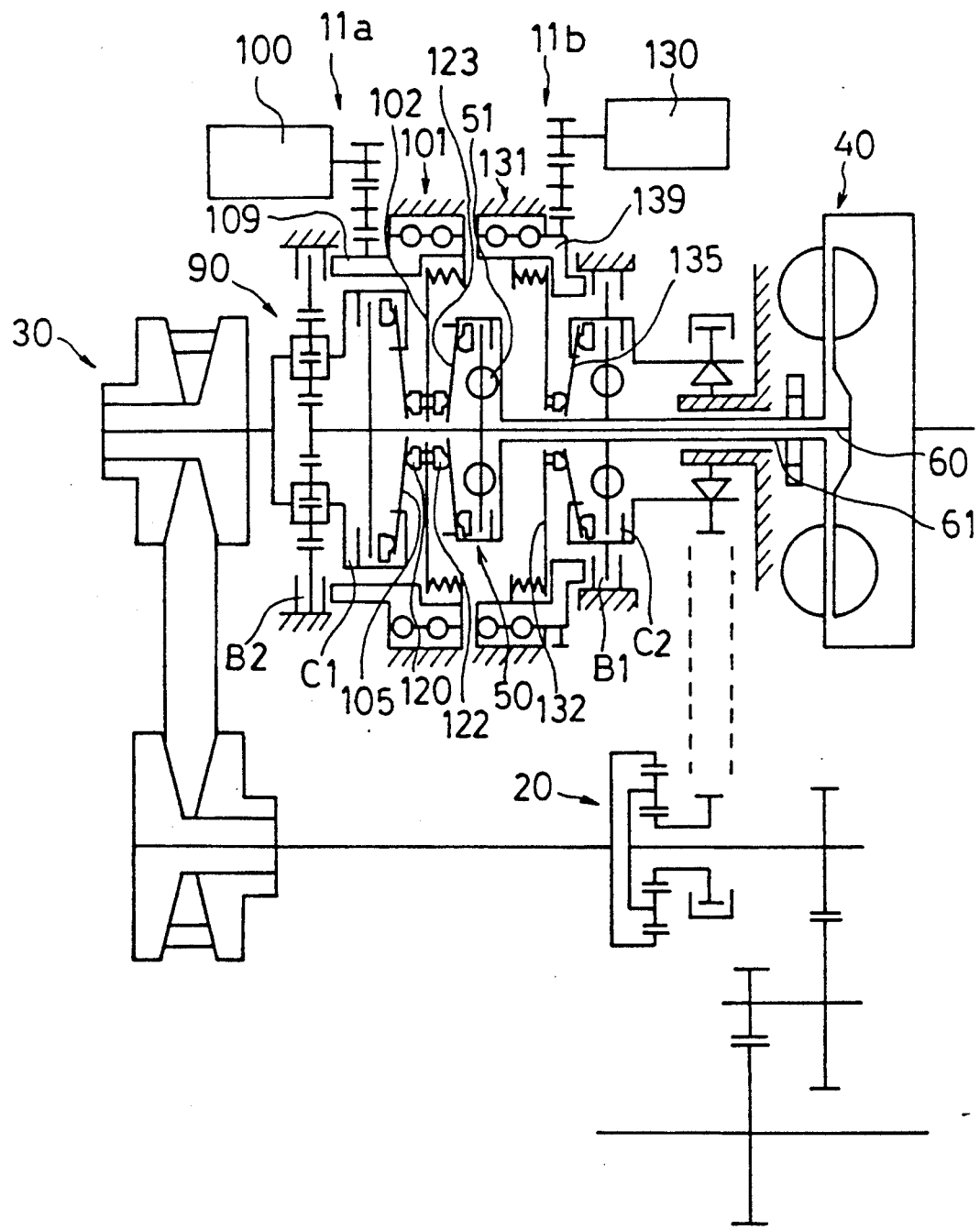

In FIG. 10, a further modified embodiment is explained. In this embodiment, the lock-up clutch 50 is situated between the connecting member 102 for the forward clutch C1 and the connecting member 132 for the high clutch C2. The lock-up clutch 50 is composed of a friction clutch situated between the input shaft 60 and the direct coupling input shaft 61, and the lock-up clutch 50 has a damper 51 which is situated between the input shaft 60 and the direct coupling input shaft 61. On both sides of the connecting member 102 for the forward/reverse switching device, the block member 120 for the forward clutch C1 and the block member 122 are situated through the thrust bearings, the block member 122 switches the lock-up clutch 50 which is released in normal condition into an engaging condition through the coned disc spring 123 by the movement of the block member 122 in the right direction in the drawing.

Accordingly, at a certain rotative position of the motor 100, the forward clutch C1 is engaged and the reverse brake B2 is released, and the lock-up clutch 50 is also released. From this situation, the male thread section 109 of the ball thread mechanism 101 is moved in the right direction in the drawing by the rotation of the motor 100; then the lock-up clutch 50 is engaged by the connecting member 102 through the block member 122 and the coned disc spring 123. At this time, despite the movement of the connecting member 102 in the right direction, the forward clutch C1 is kept engaged by the coned disc spring 105. On the contrary, when the male thread section 109 is moved in the left direction by the reverse rotation of the motor 100, the forward clutch C1 is released through the coned disc spring 105, the reverse brake B2 is engaged, and further the lock-up clutch 50 is kept released due to the coned disc spring 123.

Figure 11:
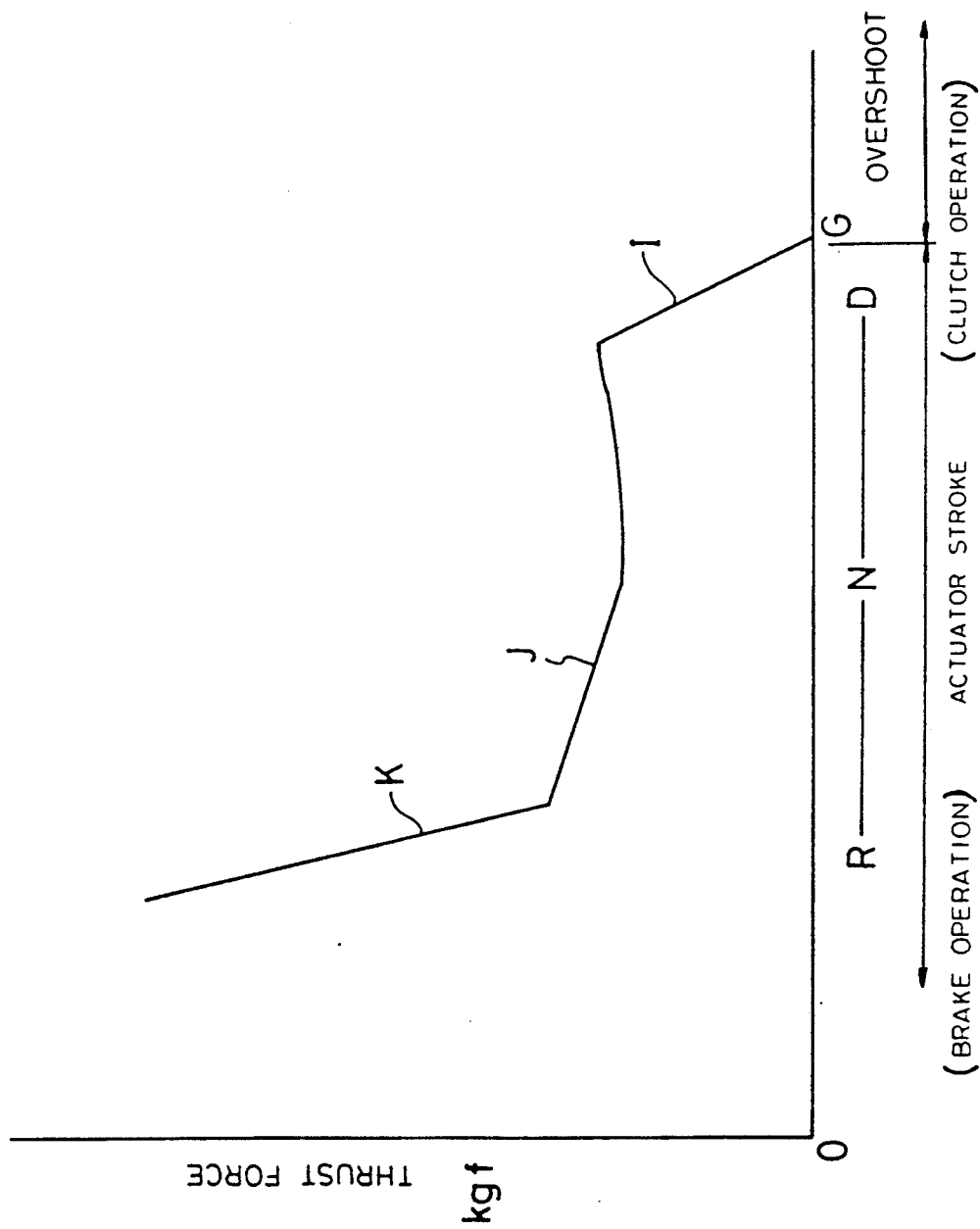
FIG. 11 is a graphical representation indicating the relationship between actuator stroke and thrust force with reference to the embodiments shown in FIGS. 1-10.

With reference to the hydraulic actuator for the frictional engaging device, for example, the actuator 11a for the forward/reverse switching device shown in FIG. 1, the relation between stroke position (R—N—D) of the actuator and the thrust force required to operate the actuator is shown in FIG. 11.

In FIG. 11, when the electric motor 100 (torque generating mechanism) is at a no load condition, namely the home-position G, the forward clutch C1 is engaged by the coned disc spring 105. The electric motor 100 generates a certain torque, and the torque is converted into a certain thrust force through the ball thread mechanism 101. Due to this motion, the connecting member 102 moves axially against the coned disc spring 105 (I), the forward clutch C1 is released, and the coned disc spring is under a certain loaded condition, then the neutral position N is obtained. Furthermore, the electric motor 100 continues rotation in one direction, the ball thread mechanism 101 moves with the coil spring 111 being pressed (J), and the connecting member 103 works to the reverse brake B2 through the coned disc spring 119, then the brake B2 is engaged (K). Consequently, in this embodiment, the thrust force based on the electric motor 100 is minimum (G) under the condition that the forward clutch C1 is engaged in the D range, the thrust force is medium at the neutral postion N, and the thrust force is maximum under the condition that the reverse brake B2 is engaged (K).

On the other hand, in the case of the high/low mode switching device 20, as in the above, the thrust force based on the electric motor 130 (torque generating mechanism) is minimum under the condition that the high clutch C2 is engaged, the thrust force is medium at the neutral position N, and the thrust force is maximum under the condition that the low coast & reverse brake B1 is engaged.

With this structure of the hydraulic actuator for the frictional engaging device, at the time of forward running which is normal usage, the thrust force based on the electric motor 100 for the forward/reverse switching device 90 is zero, consequently the electric motor 100 is kept under a non-electrified condition, and further the load (PV number) against the bearing 113 is also kept low. While at the high speed mode (H) which is used for a long time, the thrust force based on the electric motor 130 for the high/low mode switching device is zero. Then, the electric motor 130 is kept under a non-electrified condition, and the load (PV number) against the bearing 143 is kept low.

On the other hand, when the engine starts to rotate, it is necessary for the automatic transmission to be at the neutral position, and it is necessary for the high/low switching device 20 to be set at the low speed mode. Even in the above embodiments, the automatic transmission is changed to the neutral position or the low speed mode by electric control, and the rotative position of the motors for each neutral position or the low speed mode are kept by the electromagnetic brake (such as a type of brake that is under operation at the non-electrified condition), however, when the engine restarts, the above rotative positions may deviate. Further, as shwon ing FIG. 11, the electric motors 100, 130 engage or release two frictional engaging devices by rotation of the motors 100,130 in one direction from the home position G, so that a varying range of torque of the motors 100, 130 inevitably becomes large, and accordingly large capacity motors are required. In addition, large capacity electromagnetic brakes, etc. are required to restrain this large amount of torque.

In the following embodiment, the torque generating device (electric motor 100 or 130) is arranged to operate two frictional engaging devices by normal and reverse rotation (of the electric motor 100 or 130) from the home position. Because of this arrangement, the capacity of the torque generating device 100 or 130 becomes smaller. If it is impossible for the torque generating device 100 or 130 to transmit torque due to failure, the automatic transmission is always kept under the neutral position at the time of restarting. This embodiment is to provide the torque generating device with reliability.

Figure 12:
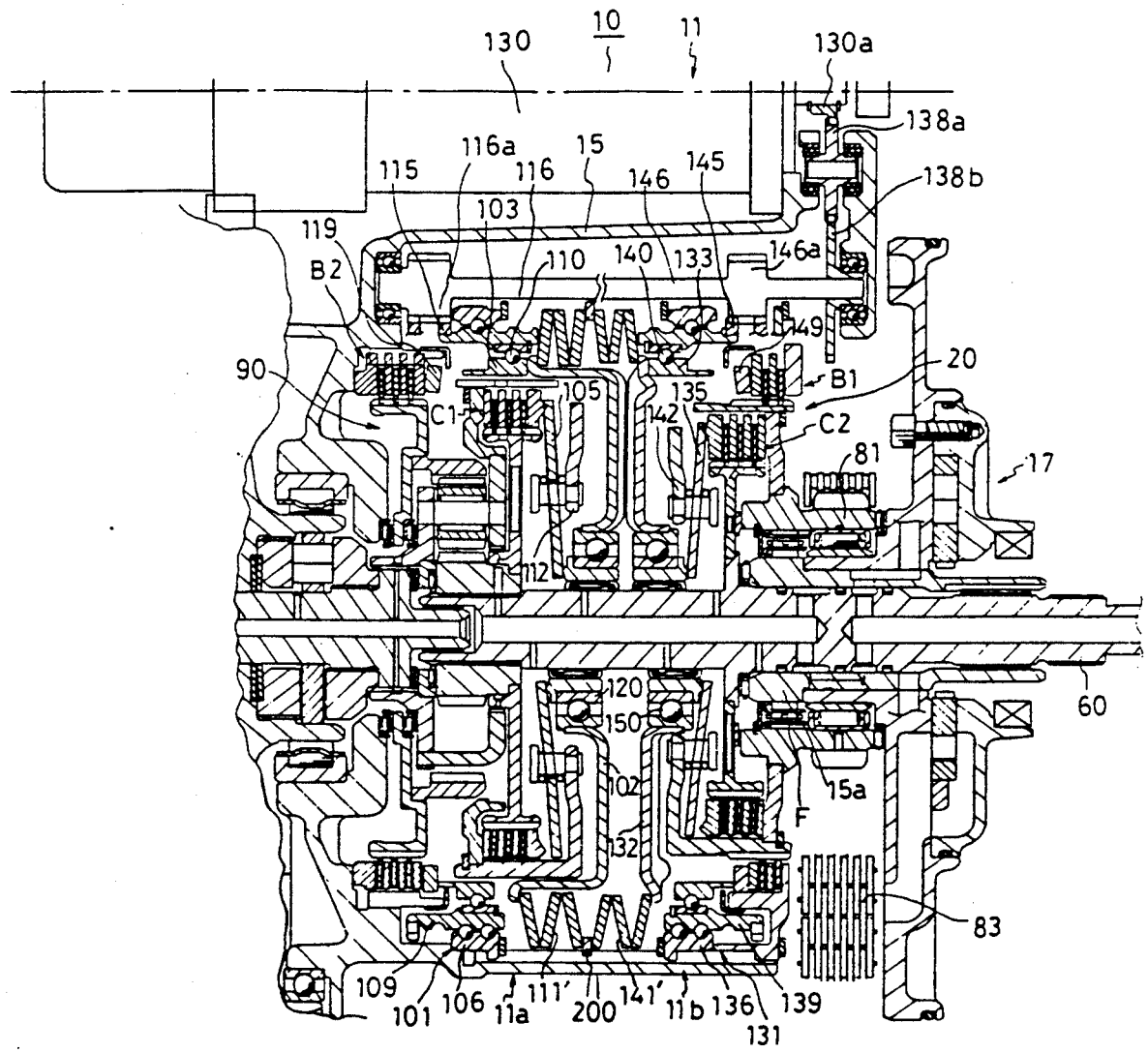
FIG. 12 is a cross sectional view of the actuator of another embodiment.
Figure 12A:
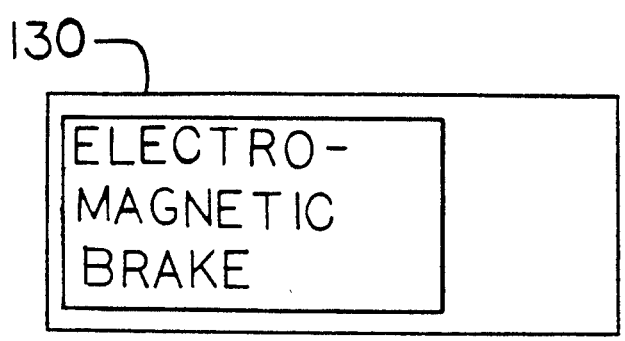
FIG. 12a is a schematic diagram of an electric motor having an electromatic brake.

The actuator unit 11 for the frictional engaging device, as shown in FIG. 12, is used for a continuously variable automatic transmission (refer to FIG. 7) having one input shaft 60 to which torque is applied through the fluid coupling or the centrifugal type lock-up clutch. The actuator unit 11, which is the same as the above mentioned embodiments, comprises the actuator 11a for the forward/reverse switching device and the actuator 11b for the high/low mode switching device. The actuators 11a, 11b have the electric motors 100 and 130 (only motor 130, one of the motors, is shown) which are separated by a certain distance in circumferential direction. The output shaft 130a of the motor 130 is connected to the shaft 146 through counter gears 138a and 138b, and the gear 146a is constituted on the shaft 146. As in the above, with regard to another motor 100 (not shown), the output shaft of the motor 100 is connected to the shaft 116 through the counter gears 138a and 138b, and the gear 116a is constituted on the shaft 116.

The actuator 11a for the forward/reverse switching device has the connecting member 102 to operate the clutch C1, and the actuator 11b for the high/low mode switching device has the connecting member 132. The connecting members 102 and 132 are so placed as to face back to back. The actuator 11a has the ball thread mechanism 101 having the female thread section 106 and the male section 109, while the actuator 11b has the ball thread mechanism 131 having the female thread section 136 and the male section 139. The female sections 106, 136 are sustained on the case 15 with no rotation and no movement in the axial direction allowed, and at the middle of these ball thread mechanisms 101, 131, a plurality of coned disc springs 111' and 141' are placed longitudinally in both right and left directions. The movement in the axial direction of these coned disc springs 111' and 141' is stopped by the snap ring 200. At the left side, namely at the end tip of the coned disc spring 111' for the forward/reverse switching device, the connecting member 102 for operating the clutch C1 contacts, while at the right side, namely at the end tip of the coned disc spring 141' for the high/low switching device, the connecting member 132 to operate the clutch C2 contacts. Furthermore, at an inner side of these connecting member 102, 132 are connected to the ball bearings 120, 150 both of which constitute the block members. These bearings 120, 150 are supported on the input shaft through needle bearings with rotation allowed, and these bearings 120, 150 also contact the coned disc springs 105, 135 to operate the clutches. The middle sections of these coned disc springs 105, 135 are supported by the supporting members 121, 142. And, under the initial condition that no force is applied to the block members 120, 150, the coned disc spring 105 situated at the side of the forward/reverse switching device presses the forward clutch C1 so that the coned disc spring 105 engages the forward clutch C1, while the coned disc spring 135 situated at the side of the high/low mode switching device presses the high clutch C2 so that the coned disc dpring 135 engages the high clutch C2. The pressing force of the coned disc springs 111', 141' which are situated outside of the connecting members 102, 132 are set to be larger than those of the coned disc springs 105, 135. Consequently, under the no load condition (in the home position) that no thrust force is transmitted from the male thread sections 109, 139 to the coned disc springs 111', 141', the pressing force of each of the coned disc springs 111', 141' respectively overcomes that of the coned disc springs 105, 135, so the forward clutch C1 and the high clutch C2 are kept under a released condition.

The gear 115 meshing with the gear 116a is fixed on the male section 109 of the ball thread mechanism 101, and the gear 145 meshing with the gear 146a is fixed on the male section 139 of the ball thread mechanism 131. The connecting member 103 is connected to an inner side of the male thread section 109 through the ball bearing 110, while the connecting member 133 is connected to an inner side of the male thread section 139 through the ball bearing 140. The connecting member 103 has a projection toward the reverse brake B2, while the connecting member 133 has a projection toward the low coast & reverse brake B1, and these projections engage the brakes B1, B2 by contacting the coned disc springs 119, 149 based on the movement of the male thread sections 109, 139 in an axial direction. When the electric motors 100, 130 are at a home position, at the male thread sections 109, 139 the coned disc spring 111', 141' for returning are at returning positions, and the projections of the connecting members 103, 133 are positioned away from the coned disc spring 119, 149, so that the projections and the coned disc springs 119, 149 do not contact. Accordingly, the forward/reverse switching device 90 is at the neutral position N in which the forward clutch C1 and the reverse brake B2 are released, and the high/low mode switching device 20 is at a low speed mode position L in which the high clutch C2 and the low coast & reverse brake B1 are released, and the low one-way clutch F is under operation. These motors 110, 130 have electromagnetic brakes to hold these motors at certain rotative positions, and the electromagnetic brakes are released when electric current is off and are operated when electric current is provided. Consequently, when the motors are in a non-electrified condition, namely when the engine does not rotate, the motors 110, 130 are at home positions.

The operation of the above embodiment is explained along with FIG. 13.

When the engine stops, in other words when the electirc motors 100, 130 are under a non-electrified condition with an ignition switch being off, the electromagnetic brake is released. The male thread sections 109, 139 of the ball thread mechanisms 101, 131 do not transmit thrust force to the coned disc springs 111', 119, and the coned disc springs 141', 149. As a result, the forward/reverse switching device 90 is at the neutral position N, as shown in FIG. 13. Under this condition, the pressing force of the coned disc spring 111' for returning overcomes that of the coned disc spring 105 for operation, the forward clutch C1 is under released condition, and the connecting member 103 does not contact the coned disc spring 119, so the reverse brake B2 is under a released condition. On the other hand, as for the high/low mode switching device 20, the pressing force of the coned disc spring 141' for returning overcomes that of the coned disc spring 135 for operation, the high clutch C2 is under a released condition, the connecting member 133 does not contact the coned disc spring 149, the low coast & reverse brake B1 is under released condition, and only the low one-way clutch F is under operation. As a result, the high/low mode switching device 20 is under the low speed mode L.

Under the above condition, when the engine is ignited, the engine is started by a cell-motor with the motors 100, 130 being non-electrified. Based on the rotation of the engine, even if the input shaft 60 rotates through the fluid coupling, the forward/reverse switching device 90 is in the neutral condition, so power is not transmitted to the belt driven continuously variable transmission device 30, and power is not transmitted from the high clutch C2 to the transfer device 80. Consequently, the output member 70 of the continuously variable transmission 12 does not rotate.

Then, when a lever is shifted to the D (or S) range, the motor 100 for the forward/reverse switching device 90 rotates the thread mechanism 101 through the gears 116a, 115. The male thread section 109 rotates relatively against the fixed female thread section 106 and moves in the right direction in FIG. 12. Due to this motion, the male thread section 109 contacts one connecting member 102 (through another connecting member 103), the male thread section 109 moves the connecting member 102 to the right against the difference of the pressing force of the coned disc spring 111' for returning and the coned disc spring 105 (refer to M shown in FIG. 13). When the thrust force comes to a certain point O (refer to FIG. 13), the coned disc spring 105 begins to transmit torque to the forward clutch C1, after which the coned disc spring 105 provides the clutch C1 with an engaging force, and the male thread section 109 moves with a large thrust force (Q) opposing the coned disc spring 111' for returning. The male thread section 109 still travels in one direction, the clutch C1 is completely engaged, and then the thrust force reaches an overshoot condition (T) (refer to FIG. 13) which opposes certain characteristics of the coned disc spring 111'. At the D (or S) range, the motor 100 is kept at the above engaging condition of the clutch C1 with the electromagnetic brake under an operating condition (ON). On the other hand, when shifting back from the D range to the neutral rang N, the electromagnetic brake is released, and the motor 100 rotates in reverse according to the coned disc spring 111'.

When the shift lever is shifted to the R range, the electric motor 100 for the forwad/reverse switching device rotates in another direction from the neutral position which eventually means the home position, the male thread section 109 of the ball thread mechanism 101 moves in the left direction in FIG. 12, and the projection of the connecting member 103 contacts and presses the coned disc spring 119 of the reverse brake B2 (V). Still further, the connecting member 103 moves and engages and operates the reverse brake B2 (V). At the R range, the electric motor 100 is kept by the electromagnetic brake in the condition in which the reverse brake B2 engaged. When the shift lever is returned from the R range to the neutral range N, the electromagnetic brake is released and the electric motor 100 is returned to the home position.

When the shift lever is at the D range and vehicle speed is low, the electric motor 130 of the high/low mode switching device 20 is at the home position, the high clutch C2 and the low coast & reverse brake B1 are both released, and only the low one-way clutch F is under operation. When the vehicle is under a certain high speed condition, the electric motor 130 rotates in one direction, the male thread section 139 of the ball thread mechanism 131 (through another connecting member 133) contacts the connecting member 132, and the connecting member 132 moves in the left direction in FIG. 12 opposing the pressing force of the coned disc spring 141' for returning and the pressing force of the coned disc spring 135 for operation. Subsequently the coned disc spring 135 for operation transmits torque to the high clutch C2, and the clutch C2 is engaged. Under the condition that the high clutch C2 is completely engaged, the electric motor 130 is held in position by the electromagnetic brake which is under operation (ON) at this time. Then a high speed mode H is obtained in which the rotation of the input shaft 60 is transmitted to the output member 70 through the belt driven continuously variable transmission device 30 and the transfer device 80. When the vehicle becomes under the low speed condition or the accelerating condition, the electromagnetic brake is in a non-operating condition (OFF), and the electric motor 130 rotates in reverse and returns to the home position.

When the shift lever is shifted to the R range or the S range, the electric motor 130 for the high/low mode switching device rotates in another direction from the home position, the male thread section 139 moves to the right in FIG. 12, the projection of the connecting member 133 contacts the coned disc spring 149 of the low coast & reverse brake B1, and the low coast & reverse brake B1 is engaged. Under the condition that the brake B1 is completely engaged, the electric motor 130 is kept at a certain position by the electromagnetic brake which is in operation at this time (ON). When the shift lever is at the S range and the vehicle reaches a certain high speed condition, the electromagnetic brake is released (OFF), the electric motor 130 rotates reversely, the low coast & reverse brake B1 is released, and the high clutch C2 is engaged.

Next are embodiments in which the above embodiment is partially modified. The explanation is conducted along with FIG. 14 to FIG. 16.

Figure 14:
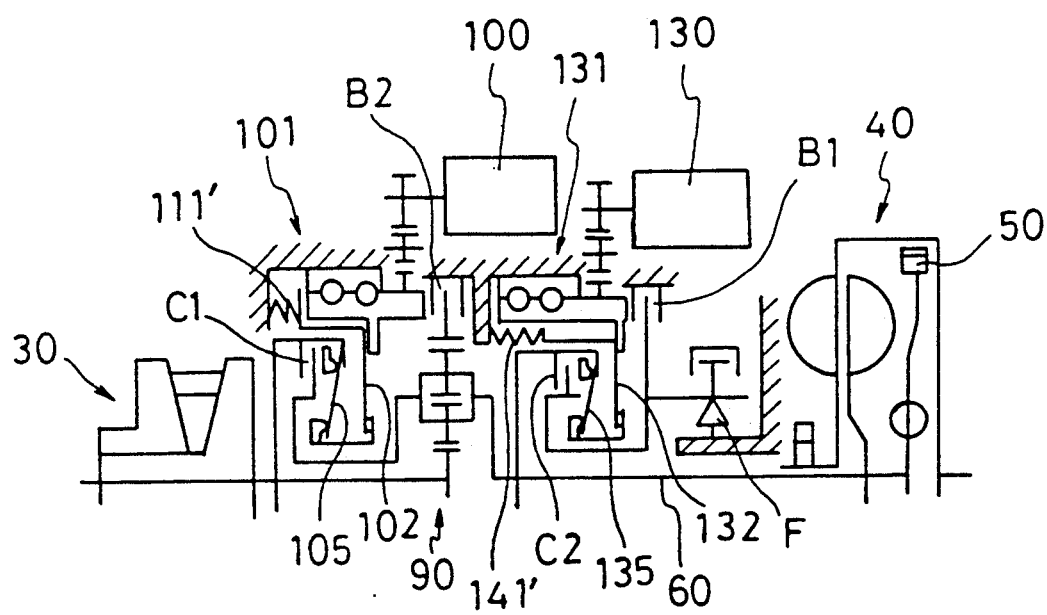

Embodiments shown in FIG. 14 and FIG. 15 are basically the same as the embodiment shown in FIG. 9, however the springs 111', 141' for returning are situated between rigid members and the connecting members 102, 132, and the rotation of the input shaft 60 is transmitted to the high clutch C2 through the hydraulic coupling 40 or the lock-up clutch 50.

Consequently in this embodiment, when the electric motors 100, 130 are at the home position, the springs 111', 141' for returning overcome the pressing force of the coned disc springs 105, 135 for operation, then the clutches C1, C2 are released, and the brakes B1, B2 are also released.

Figure 16:
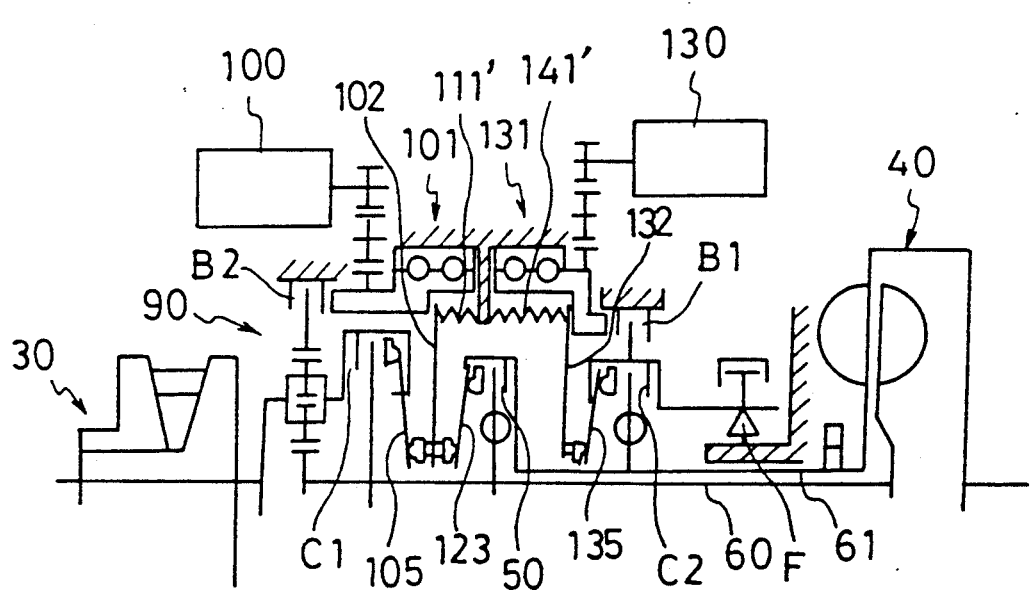

An embodiment is shown in FIG. 16 which is similar to the embodiment shown in FIG. 10, the lock-up clutch 50 is placed between the forward clutch C1 and the high clutch C2, and the springs 111', 141' for returning are installed between the rigid member and the connecting members 102, 132.

Accordingly in this embodiment, when the electric motor 100 is at the home position, the springs 111' for returning overcome the pressing force of the coned disc spring 105 for the forward clutch C1 and the coned disc spring 123 for the lock-up clutch 50, the forward clutch C1 and the lock-up clutch 50 are in a released condition, and the reverse brake B2 is also in a released condition. And, when the electric motor 100 rotates in one direction, at first the forward clutch C1 is engaged, the electric motor 100 rotates in the same direction, and then the lock-up clutch 50 is engaged. On the other hand, when the electric motor 100 rotates in another direction from the home position, the reverse brake B2 is engaged.

TECHNICAL ADVANTAGES OF THE INVENTION

As explained through the above embodiments along with the drawings, torque generated from the torque generating mechanism such as the electric motor 100, etc. is directly converted into thrust force by the torque-thrust conversion mechanism which converts torque into thrust force along with an increment of force, so that engaging force for the frictional engaging devices are directly controlled electrically, and further, the control is performed with ease and the response becomes better, and the mechanism becomes simple. Furthermore, one torque-thrust conversion mechanism generates thrust force in different directions, the connecting means are provided to transmit the thrust force in different directions to each separate frictional engaging device, namely one torque generating mechanism can control at least two frictional engaging devices, so the structure of the mechanism is further simplified, and the control becomes simple and easy, and consequently reliability is enhanced.

In the case where the thread mechanism, particularly the ball thread mechanisms (101, 131), are used as the torque-thrust conversion mechanism, the mechanisms (101, 131) are situated with encompassing axes of motion, so that a large thrust force is generated with simple structure.

The connecting means (102 and 103, or, 132 and 133) are made up of two connecting means which operate respective frictional engaging devices (C1 and B2, or, C2 and B1). And, in the case that at least one of connecting means (102, 132) have elastic means (111, 141), the frictional engaging devices are protected against excessive pressing force, so durability of the actuator and the frictional engaging devices are secured. Furthermore, in the case that the elastic means are coil springs which absorb excessive deformation of the spring means (105, 135) which keep the frictional engaging devices (C1, C2) engaged, timing for engaing and release of both frictional engaging devices are precisely secured, reliability is enhanced in that its function is performed by the combination of engagement and release of the frictional engaging devices.

In the case that the bearings (113, 143, 120, 150) are situated between the connecting means (102, 132) and the spring means (105, 135) which keep the frictional engaging devices (C1, C2) engaged, when the frictional engaging devices are in an engaged condition by the spring means, a little thrust force is applied to the bearings, so durability of the bearings (113, 143, 120, 150) is enhanced.

In the case that the actuators are provided to operate the clutches and the brakes for the forward/reverse switching device (90) or the high/low mode switching device (20), the structure becomes compact, and sure and precise control is performed. Furthermore in the case that the actuator to operate the forward/reverse switching device and the actuator to operate the high/low switching are situated closely to each other, the structure can become further compact and sure control is performed.

Ordinarily the clutches are kept in an engaging condition by the spring means, and the clutches are released while the brakes are engeged by the torque generating mechanism; due to this arrangement of the structure, when the clutches are in the engaging condition, which occupies a large portion of usage such as, for example, forward running and high speed mode, the torque generating mechanism is in a condition, such as exists when it is in the home position, etc., which does not bear a large load, and consequently no large load is applied to both the torque-thrust conversion mechanism and the connecting means, so durability of the actuators and the bearings are sustained and reliability is enhanced.

In the case where the torque generating mechanism (100, 130) is at its home position, as both frictional engaging devices (C1 and B2, and, C2 and B1) are set to be in a released condition, the torque generating mechanism rotates in one direction or another direction to operate each frictional engaging device, so only a small thrust force based on the torque generating mechanism is necessary, furthermore capacity of the holding mecanism such as the electromagnetic brake holding the torque generating mechanism at a certain rotative position also becomes small.

In particular, with reference to the actuator (11a) for the forward/reverse switching device, in the case that the torque generating mechanism (100) is at the home position, the forward clutch (C1) and the reverse brake (B2) are set to be in a released condition. Even if electric circuits have failures and the actuator is in a non-loaded condition when the engine is ignited, the rotation of the engine is not transmitted to the output member (70), so a sure fale-safe system is establised.

With reference to the actuator (11b) for the high/low mode switching device, in the case that the torque generating mechanism (130) is at the home position, the high clutch (C2) and the low coast & reverse brake (B1) are set to be in a released condition, even if electric circuits have failures and the actuator is in a non-loaded condition, the high/low mode switching device is kept under the low speed mode (L), and accordingly safety is secured.

Furthermore, in the case that spring means (111', 141') for returning are employed having a strong pressing force against the spring means (105, 135) pressing the frictional engaging devices (C1, C2) toward an engaging direction, the torque generating mechanisms (100, 130) are securely kept at the home position when the torque generating mechanism (100, 130) are in a non-electrified condition.

In the case that the holding means such as the electromagnetic brake, etc. are released when in a non-electrified condition, the torque generating mechanisms (100, 130) are kept in the home position.

What is claimed is:

1. An actuator for frictional engaging devices controlled by electric signals from a control device and disposed in a power transmission device, comprising:
   a torque generating mechanism which converts electric energy into torque,
   at least two movably mounted frictional engaging devices having respective initial first positions,
   a torque-thrust conversion mechanism which converts torque generated from said torque generating mechanism into an augmented thrust force for moving said at least two frictional engaging devices from said respective initial first positions to different second positions respectively, said torque-thrust conversion mechanism having a given initial position,
   a connecting means which transmits said augmented thrust force generated from said torque-thrust conversion mechanism to each respective one of said at least two frictional engaging devices, and
   first spring means for urging at least one of said at least two frictional engaging devices to be in a compressed condition,
   whereby said torque-thrust conversion mechanism can move said at least two frictional engaging devices from said respective initial first positions to the second positions respectively by rotation in one rotational direction from said given initial position.

2. An actuator for frictional engaging devices as claimed in claim 1, wherein when said torque generating mechanism is at a home position, said at least one of said two frictional engaging devices compressed by said first spring means is engaged while the other of said two frictional engaging devices is released, and when said torque generating mechanism rotates in one direction from said home position, said one of said two frictional engaging devices is released against a force exerted by said first spring means and said other one of said two frictional engaging devices is engaged.

3. An actuator for frictional engaging devices as claimed in claim 1, wherein said torque/thrust conversion mechanism is a thread mechanism which includes a female thread and a male thread which can rotate relative to each other.

4. An actuator for frictional engaging devices as claimed in claim 3, wherein said thread mechanism includes balls between said female thread and said male thread, thereby forming a ball thread mechanism.

5. An actuator for frictional engaging devices as claimed in claim 1, further comprising an elastic means, wherein said connecting means includes two separate connecting means each of which independently operates each of at least two frictional engaging devices, and at least one of said two separate connecting means is connected to said elastic means.

6. An actuator for frictional engaging devices as claimed in claim 5, wherein said elastic means is a coil spring for absorbing extreme deformation of said first spring means and maintains an engaging condition of said at least one of said frictional engaging devices.

7. An actuator for frictional engaging devices as claimed in claim 1, wherein a bearing is disposed between said connecting means and said first spring means, and said first spring means causes said at least one of each of frictional engaging devices and said connecting means to remain under an engaged condition, so that thrust force transmitted to said bearing becomes weaker when said at least one of said frictional engaging devices is urged into an engaged condition by said first spring means.

8. An actuator for frictional engaging devices as claimed in claim 1, wherein a bearing is disposed between said connecting means and said first spring means, said first spring means causing said at least one of said frictional engaging devices to be in an engaged condition so that only a small amount of relative rotation of said bearing occurs when said at least one of said frictional engaging devices is in a released condition.

9. An actuator for frictional engaging devices as claimed in claim 1, further comprising a second spring means serving as a return spring means and having a strong pressing force directed against said first spring means, and said second spring means is disposed between said torque-thrust conversion mechanism and said first spring means.

10. An actuator for frictional engaging devices as claimed in claim 1, further comprising a forward-reverse switching device which comprises a planetary gear and which has a forward running condition, and wherein said at least one of said frictional engaging devices which is always compressed by said first spring means is a first clutch which connects a plurality of elements of said forward-reverse switching device at said forward running condition of said forward-reverse switching device, and wherein another one of said at least two frictional engaging devices is a brake which is adapted to halt motion of a predetermined element of said forward-reverse switching device.

11. An actuator for frictional engaging devices as claimed in claim 10, wherein said planetary gear is a dual planetary gear, said plurality of predetermined elements which are connected by said first clutch during a forward running condition include a sun gear and a carrier of said dual planetary gear, and said predetermined element which is halted by said brake at reverse running is a ring gear of said dual planetary gear.

12. An actuator for frictional engaging devices as claimed in claim 11, wherein when said torque generating mechanism is at a home position, said at least one of said at least two frictional engaging devices is released by said second spring means against said first spring means, and another of said at least two frictional engaging means is also released.

13. An actuator for frictional engaging devices as claimed in claim 10, wherein said first clutch is constantly biased to an engaged condition by said first spring means, and rotational movement of said torque-thrust conversion mechanism in one direction from said given initial position causes release of said first clutch and engagement of said brake.

14. An actuator for frictional engaging devices as claimed in claim 10, wherein said first clutch is constantly biased to a released condition by said second spring means, said second spring means exerting a greater force than said first spring means, wherein said first clutch is engaged in response to a pressing force exerted by said first spring means upon rotational movement in one direction of said torque-thrust conversion mechanism against said second spring means, and wherein said brake is engaged in response to an opposite rotational movement of said torque-thrust conversion mechanism.

15. An actuator for frictional engaging devices as claimed in claim 14, wherein said torque generating mechanism is an electric motor having an electromagnetic brake, and wherein said electromagnetic brake is released when electric current to said electric motor is cut off.

16. An actuator for frictional engaging devices as claimed in claim 1, wherein said at least one of said frictional engaging devices is a first clutch and another one of said at least two frictional engaging devices is a brake for a high/low mode switching device, said first clutch is engaged at a high speed mode of said power transmission device, and said brake conversion mechanism against said second spring means, and wherein said brake is engaged in response to an opposite rotational movement of said torque-thrust conversion mechanism.

17. An actuator for frictional engaging devices as claimed in claim 16, wherein said high/low mode switching device has a single planetary gear,
   wherein a first element of said single planetary gear is constantly fed with torque from an input side of said power transmission device through a continuously variable transmission device, a second element of said planetary gear is connected at an output side of said power transmission device, and a third element of said planetary gear is fed with torque from said input side through said first clutch, and wherein when said power transmission device is in the high speed mode and said first clutch is engaged, said single planetary gear combines torque from said continuously variable transmission device and torque directly transmitted to said third element, and
   wherein when said power transmission device is in the low speed mode and said brake is engaged, said single planetary gear reduces a rotation output torque from said continuously variable transmission device.

18. An actuator for frictional engaging devices as claimed in claim 16, wherein said first clutch is constantly biased to an engaged condition by said first spring means, and wherein said first clutch is released while said brake is engaged by movement in one direction of said torque-thrust conversion mechanism caused by rotation of said torque generating mechanism in one rotational direction from a home position.

19. An actuator for frictional engaging devices as claimed in claim 16, wherein said torque-thrust conversion mechanism has a home position, and wherein said first clutch is constantly biased to a released condition by a second spring means, said second spring means exerting a greater force than said first spring means, wherein said first clutch is engaged in response to a pressing force exerted by said first spring means upon movement of said torque-thrust conversion mechanism from said home position against said second spring means, and wherein said brake is engaged by an opposite rotational movement of said torque-thrust conversion mechanism from said home position.

20. An actuator for frictional engaging devices as claimed in claim 19, wherein said torque generating mechanism is an electric motor having an electromagnetic brake, wherein said electromagnetic brake released when electric current to said electric motor is cut off.

21. An actuator for frictional engaging devices as claimed in claim 1, further comprising a forward-reverse switching device which includes a first clutch and a brake, and wherein one of said frictional engaging devices comprises said first clutch and is engaged in a forward running condition of said forward-reverse switching device, another of said frictional engaging devices is said brake, said brake being engaged in a reverse running condition of said forward-reverse switching device, and said frictional engaging devices further comprising a second clutch, said second clutch consisting of a lock-up clutch, wherein when said torque-thrust conversion mechanism is disposed at a certain position, said first clutch is engaged in response to movement in one direction from said certain position of said torque-thrust conversion mechanism, said second clutch is maintained in an engaged condition with said first clutch, and said brake is engaged in response to movement of said torque-thrust conversion mechanism in another rotational direction from said certain position of said torque-thrust conversion mechanism.

* * * * *